United States Patent
Nakaike

(10) Patent No.: US 9,250,880 B2
(45) Date of Patent: Feb. 2, 2016

(54) METHOD FOR OBTAINING EXECUTION FREQUENCY INFORMATION ON EXECUTION PATHS IN CONTROL FLOW GRAPH, AND COMPUTER AND COMPUTER PROGRAM FOR OBTAINING THE INFORMATION

(71) Applicant: International Business Machines Corporation, Armonk, NY (US)

(72) Inventor: Takuya Nakaike, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/551,485

(22) Filed: Nov. 24, 2014

(65) Prior Publication Data

US 2015/0149988 A1    May 28, 2015

(30) Foreign Application Priority Data

Nov. 25, 2013 (JP) .................. 2013-243092

(51) Int. Cl.
G06F 9/45    (2006.01)

(52) U.S. Cl.
CPC .............. G06F 8/4441 (2013.01); G06F 8/433 (2013.01)

(58) Field of Classification Search
CPC .................................................. G06F 8/4441
See application file for complete search history.

(56) References Cited

U.S. PATENT DOCUMENTS

| | | | |
|---|---|---|---|
| 6,327,699 B1* | 12/2001 | Larus et al. | 717/128 |
| 6,848,100 B1* | 1/2005 | Wu et al. | 717/157 |
| 2004/0261067 A1* | 12/2004 | Komatsu et al. | 717/158 |
| 2006/0048114 A1* | 3/2006 | Schmidt | 717/148 |
| 2006/0242636 A1* | 10/2006 | Chilimbi et al. | 717/158 |

FOREIGN PATENT DOCUMENTS

| | | |
|---|---|---|
| JP | 5197563 A | 8/1993 |
| JP | 11242597 A | 9/1999 |
| JP | 2000347879 A | 12/2000 |
| JP | 2001236227 A | 8/2001 |
| JP | 200532018 A | 2/2005 |
| JP | 2006120124 A | 5/2006 |

OTHER PUBLICATIONS

Ball et al., "Efficient Path Profiling", International Symposium on Microarchitecture, 1996 IEEE, pp. 46-57.
Bond et al., "Continuous Path and Edge Profiling", Proceedings of the 38th Annual IEEE/ACM International Symposium on Microarchitecture, 2005 IEEE.
Japanese Patent Application No. 2013-243092, filed Nov. 25, 2013.

* cited by examiner

Primary Examiner — Philip Wang
(74) Attorney, Agent, or Firm — Maeve McCarthy

(57) ABSTRACT

The present invention is a technique for obtaining execution frequency information on execution paths in a CFG, including preparing a CFG from a source code read into a memory, preparation of the CGF including modifying the CFG by assigning path value zero to an edge v→w between a precedent basic block v and a successor basic block w following the predecessor basic block v in a case where the successor basic block w has a predecessor basic block x other than the predecessor basic block v, and where the successor basic block w exists on a fall-through path from the predecessor basic block x. The technique also includes obtaining execution frequency information by using the modified CFG.

11 Claims, 15 Drawing Sheets

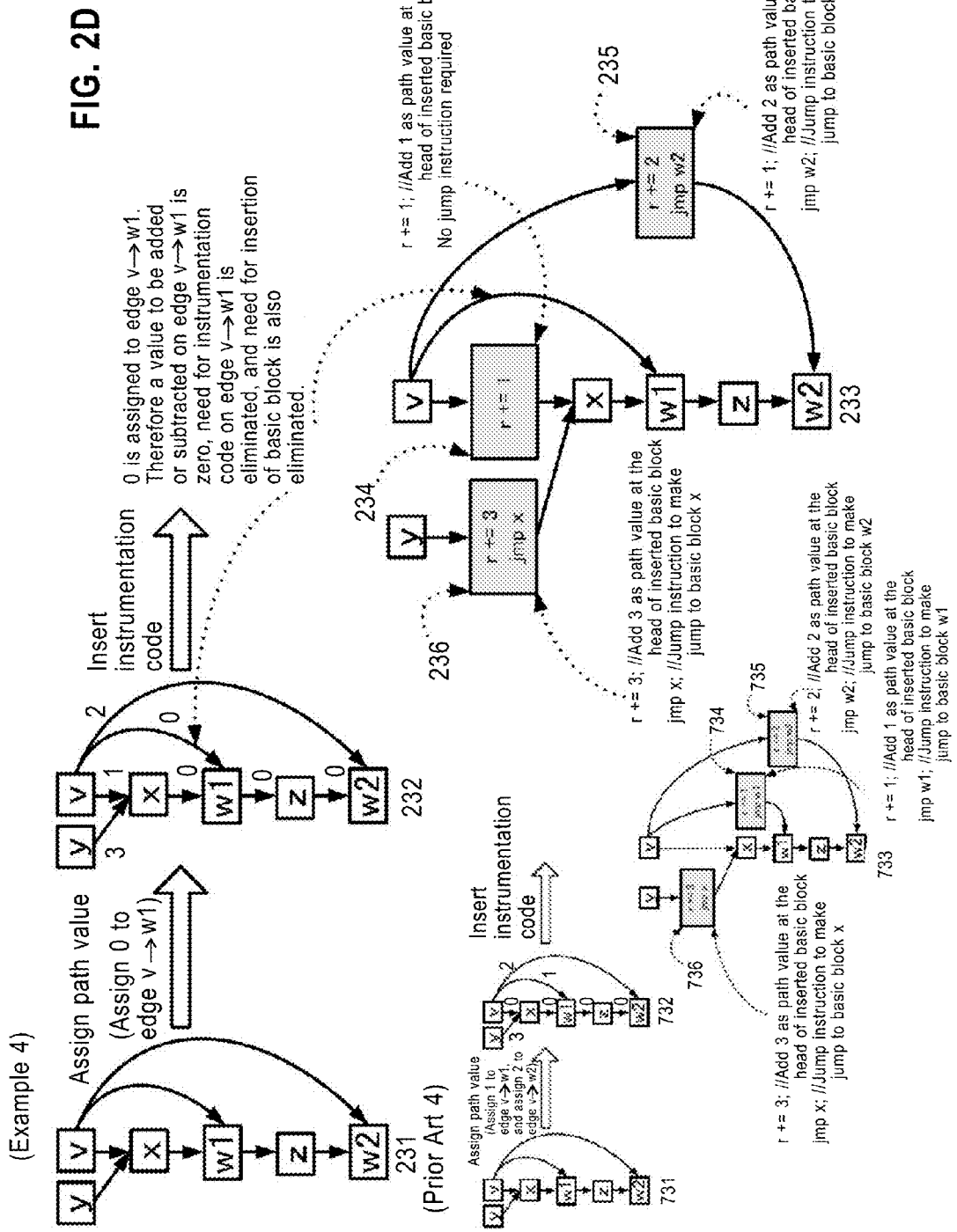

```
401
01  for basic block V in reverse topological order of control flow graph
02      if V is the exit of the control flow graph
03          NumPath (V) = 1;
04      else
05          NumPath (V) = 0;
06          edge E' = findNewBBEdge (V);
07          if (E' != NULL)
08              Val (E') = NumPath (V);
09              NumPath (V) = NumPath (V) + NumPath (successorOf (E'));
10          for edge E = V → W
11              if (E == E') continue;
12              Val (E) = NumPath (V);
13              NumPath (V) = NumPath (V) + NumPath (W);
```

(Note 1) Code shown in lines 06, 07, 08, 09, and 11 is code added in the implementation of the present invention, and is an algorithm for assigning value Val(E) to edge E.

(Note 2) Lines 05, 07, 08, and 12 correspond to an algorithm for assigning path value 0 to the first edge in accordance with the implementation of the present invention.

FIG. 4

METHOD FOR OBTAINING EXECUTION FREQUENCY INFORMATION ON EXECUTION PATHS IN CONTROL FLOW GRAPH, AND COMPUTER AND COMPUTER PROGRAM FOR OBTAINING THE INFORMATION

CROSS-REFERENCE TO RELATED APPLICATIONS

This application claims the benefit of priority under 35 U.S.C. §119 from Application No. 2013-243092, filed on Nov. 25, 2013 in Japan.

BACKGROUND

The present invention relates a technique for obtaining execution frequency information on execution paths in a control flow graph.

A control flow graph is a graph in which all paths each having a possibility of being passed when a program is executed are expressed and the flow of control of the program is expressed. In this graph, a node represents a basic block (that is, no branch and no confluence at any intermediate points), and a directed edge making a node-to-node connection denotes a transition from one basic block to another basic block.

A basic block is a sequence of processing (statements or instructions) in a program, having no branch and no confluence at any intermediate points. Statements in a basic block are executed straight from the first to the last. In general, an entry block and an exit block exist as an entrance and an exit, respectively, of the entire graph described above.

In a control flow graph, a state where a directed edge is drawn from a basic block X toward a basic block Y is expressed as X→Y. X in this expression is referred to as a predecessor basic block or a predecessor node, and Y as a successor basic block or a successor node. Also, a node following multiple predecessor nodes is referred to as a merge node, and a node followed by multiple successor nodes is referred to as a branch node.

Control flow graphs are generally used in compiler optimization and static code analysis tools.

Profile information on a control flow graph, e.g., execution frequency information on directed edges and execution paths enables improving the effect of complier optimization. Profiling of execution frequency information on directed edges and execution paths in a control flow graph requires insertion of an instrumentation code for measurement of the execution frequency on each directed edge. As this instrumentation code, a path value is given to each edge. Giving such a path value to each edge eliminates the need for counting the edge every time; the sum of path values is collected as execution frequency information by summing up path values each assigned to the edge when the edge is passed by execution of the program. However, insertion of the above-described instrumentation code on each of the above-described directed edges increases the overhead, resulting in the degradation of runtime performance.

Non-patent Literatures 1 and 2 shown below describe techniques for profiling the frequencies of executions of execution paths.

Non-patent Literature 1 describes efficient path profiling.
Non-patent Literature 2 describes continuous path and edge profiling.

[Non-patent Literature 1] Thomas Ball et. Al., "Efficient Path Profiling", International Symposium on Microarchitecture (MICRO'96), IEEE

[Non-patent Literature 2] Michael D. Bond et Al., "Continuous Path and Edge Profiling", International Symposium on Microarchitecture (MICRO'05), IEEE FIGS. 7A to 7D are schematic diagrams showing a state where a path value 1 is assigned to an edge between a preceding basic block (predecessor basic block) v and a subsequent basic block (successor basic block) w or w1 and an instrumentation code is inserted in control flow graphs (701, 711, 721, and 731) before modification respectively shown in FIGS. 7A to 7D. Descriptions will be made of how the control flow graphs (701, 711, 721, and 731) respectively shown in FIGS. 7A to 7D are modified by insertion of an instrumentation code (i.e., an instruction to add a path value). The path value is an integer value uniquely representing an execution path passed through the control flow graph from a starting point to an end point.

Referring to FIG. 7A (Prior Art 1), the control flow graph (701) before modification has a predecessor basic block v and two successor basic blocks following the predecessor basic block v: a successor basic block x (which is a predecessor basic block precedent to another successor basic block w, and which is also referred to as predecessor basic block x) and a successor basic block w. The predecessor basic block v is connected to the successor basic block x by an edge v→x and to the successor basic block w by an edge v→w. The successor basic block x is connected to the successor basic block w by an edge x→w.

A computer assigns a path value 0 to the edge v→x between the predecessor basic block v and the successor basic block x in the control flow graph (701) before modification, and assigns a path value 1 to the edge v→w between the predecessor basic block v and the successor basic block w. The computer also assigns a path value 0 to the other edge. Accordingly, a control flow graph (702) has the edge v→x assigned the path value 0 and has the edge v→w assigned the path value 1.

Next, the computer performs an operation to insert the instrumentation code in the control flow graph (702).

Since the path value 0 is assigned to the edge v→x, the computer inserts no instrumentation code thereon. The computer also inserts no instrumentation code with respect to the other edge assigned the path value 0.

Since the path value 1 is assigned to the edge v→w, the computer inserts on the edge v→w a basic block (704) including an instruction to add 1 as a path value (r+=1). The inserted basic block (704) includes a jump instruction (jmp w) to make a jump to the successor basic block w as well as the instruction to add 1 as a path value (r+=1).

In a modified control flow graph (703) shown in FIG. 7A, the number of jump instructions is increased by 1 (jmp w) (704) as a result of insertion of the instrumentation code. A problem thus arises that the overhead is increased.

Referring to FIG. 7B (Prior Art 2), the control flow graph (711) before modification has a predecessor basic block v and two successor basic blocks following the predecessor basic block v: a successor basic block x (which is a predecessor basic block precedent to another successor basic block w, and which is also referred to as predecessor basic block x), a successor basic block w, and a predecessor basic block y other than the above-mentioned predecessor basic block v. The predecessor basic block v is connected to the successor basic block x by an edge v→x and to the successor basic block w by an edge v→w. The predecessor basic block y is connected to the successor basic block x by an edge y→x. The successor basic block x is connected to the successor basic block w by an edge x→w.

A computer assigns a path value 0 to the edge v→x between the predecessor basic block v and the successor basic block x in the control flow graph (711) before modification, assigns a path value 1 to the edge v→w between the predecessor basic block v and the successor basic block w, and assigns a path value 2 to the edge y→x between the predecessor basic block y and the successor basic block x. The computer also assigns a path value 0 to the other edge. Accordingly, a control flow graph (712) has the edge v→x assigned the path value 0, has the edge v→w assigned the path value 1 and has the edge y→x assigned the path value 2.

Next, the computer performs an operation to insert the instrumentation code in the control flow graph (712).

Since the path value 0 is assigned to the edge v→x, the computer inserts no instrumentation code thereon. The computer also inserts no instrumentation code with respect to the other edge assigned the path value 0.

Since the path value 1 is assigned to the edge v→w, the computer inserts on the edge v→w a basic block (714) including an instruction to add 1 as a path value (r+=1). The inserted basic block (714) includes a jump instruction (jmp w) to make a jump to the successor basic block w as well as the instruction to add 1 as a path value (r+=1).

Similarly, since the path value 2 is assigned to the edge y→x, the computer inserts on the edge y→x a basic block (715) including an instruction to add 2 as a path value (r+=2). The inserted basic block (715) includes a jump instruction (jmp x) to make a jump to the successor basic block x as well as the instruction to add 2 as a path value (r+=2).

In a modified control flow graph (713) shown in FIG. 7B, the number of jump instructions is increased by 2 (jmp w and jmp x) (714 and 715, respectively) as a result of insertion of the instrumentation code. A problem thus arises that the overhead is increased.

Referring to FIG. 7C (Prior Art 3), the control flow graph (721) before modification has a predecessor basic block v and three successor basic blocks following the predecessor basic block v: a successor basic block x (which is a predecessor basic block precedent to other successor basic blocks w1 and w2, and which is also referred to as predecessor basic block x); successor basic blocks w1 and w2; and a predecessor basic block y other than the predecessor basic block v (which is a predecessor basic block precedent to the successor basic block w2). The predecessor basic block v is connected to the successor basic block x by an edge v→x, to the successor basic block w1 by an edge v→w1, and to the successor basic block w2 by an edge v→w2. The successor basic block x is connected to the successor basic block w1 by an edge x→w1. The successor basic block w1 is connected to the predecessor basic block y by an edge w1→y. The predecessor basic block y is connected to the successor basic block w2 by an edge y→w2.

A computer assigns a path value 0 to the edge v→x between the predecessor basic block v and the successor basic block x in the control flow graph (721) before modification, assigns a path value 1 to the edge v→w1 between the predecessor basic block v and the successor basic block w1, and assigns a path value 2 to the edge v→w2 between the predecessor basic block v and the successor basic block w2. The computer also assigns a path value 0 to the other edges. Accordingly, a control flow graph (722) has the edge v→x assigned the path value 0, has the edge v→w1 assigned the path value 1, and has the edge v→w2 assigned the path value 2.

Next, the computer performs an operation to insert the instrumentation code in the control flow graph (722).

Since the path value 0 is assigned to the edge v→x, the computer inserts no instrumentation code thereon. The computer also inserts no instrumentation code with respect to the other edges assigned the path value 0.

Since the path value 1 is assigned to the edge v→w1, the computer inserts on the edge v→w1 a basic block (724) including an instruction to add 1 as a path value (r+=1). The inserted basic block (724) includes a jump instruction (jmp w1) to make a jump to the successor basic block w1 as well as the instruction to add 1 as a path value (r+=1).

Similarly, since the path value 2 is assigned to the edge v→w2, the computer inserts on the edge v→w2 a basic block (725) including an instruction to add 2 as a path value (r+=2). The inserted basic block (725) includes a jump instruction (jmp w2) to make a jump to the successor basic block w2 as well as the instruction to add 2 as a path value (r+=2).

In a modified control flow graph (723) shown in FIG. 7C, the number of jump instructions is increased by 2 (jmp w1 and jmp w2) (724 and 725, respectively) as a result of insertion of the instrumentation code. A problem thus arises that the overhead is increased.

Referring to FIG. 7D (Prior Art 4), the control flow graph (731) before modification has a predecessor basic block v and three successor basic blocks following the predecessor basic block v: a successor basic block x (which is a predecessor basic block precedent to another successor basic block w, and which is also referred to as predecessor basic block x), successor basic blocks w1 and w2, a predecessor basic block z (which is a predecessor basic block precedent to the successor basic block w2) and a predecessor basic block y (which is a predecessor basic block precedent to the successor basic block x). The predecessor basic block v is connected to the successor basic block x by an edge v→x, to the successor basic block w1 by an edge v→w1, and to the successor basic block w2 by an edge v→w2. The predecessor basic block y is connected to the successor basic block x by an edge y→x. The successor basic block x is connected to the successor basic block w1 by an edge x→w1. The successor basic block w1 is connected to the predecessor basic block z by an edge w1→z. The predecessor basic block z is connected to the successor basic block w2 by an edge z→w2.

A computer assigns a path value 0 to the edge v→x between the predecessor basic block v and the successor basic block x in the control flow graph (731) before modification, assigns a path value 1 to the edge v→w1 between the predecessor basic block v and the successor basic block w1, and assigns a path value 2 to the edge v→w2 between the predecessor basic block v and the successor basic block w2. The computer also assigns a path value 0 to the other edges. Accordingly, a control flow graph (732) has the edge v→x assigned the path value 0, has the edge v→w1 assigned the path value 1, and has the edge v→w2 assigned the path value 2.

Next, the computer performs an operation to insert the instrumentation code in the control flow graph (732).

Since the path value 0 is assigned to the edge v→x, the computer inserts no instrumentation code thereon. The computer also inserts no instrumentation code with respect to the other edges assigned the path value 0.

Since the path value 1 is assigned to the edge v→w1, the computer inserts on the edge v→w1 a basic block (734) including an instruction to add 1 as a path value (r+=1). The inserted basic block (734) includes a jump instruction (jmp w1) to make a jump to the successor basic block w1 as well as the instruction to add 1 as a path value (r+=1).

Similarly, since the path value 2 is assigned to the edge v→w2, the computer inserts on the edge v→w2 a basic block (735) including an instruction to add 2 as a path value (r+=2). The inserted basic block (735) includes a jump instruction (jmp w2) to make a jump to the successor basic block w2 as well as the instruction to add 2 as a path value (r+=2).

Similarly, since the path value 3 is assigned to the edge y→x, the computer inserts on the edge y→x a basic block (736) including an instruction to add 3 as a path value (r+=3). The inserted basic block (736) includes a jump instruction (jmp x) to make a jump to the successor basic block x as well as the instruction to add 3 as a path value (r+=3).

In a modified control flow graph (733) shown in FIG. 7D, the number of jump instructions is increased by 3 (jmp w1, jmp w2, and jmp x) (734, 735, and 736, respectively) as a result of insertion of the instrumentation code. A problem thus arises that the overhead is increased.

As described above, the method shown as prior art entails the problem that as a result of insertion of the instrumentation code for collecting profile information, the number of jump instructions is increased and the overhead is increased.

In the method described in Non-patent Literature 1, an instrumentation code is placed on directed edges to calculate, only by addition and subtraction, integer values (path values) representing execution paths passed from a start point to an end point of a control flow graph. In the method described in Non-patent Literature 1, the placement of the instrumentation code is optimized by obtaining a maximum-cost spanning tree of the control flow graph and inserting the instrumentation code on a directed edge not included in the maximum-cost spanning tree. In the method described in Non-patent Literature 1, however, the overhead is large because path values are recorded every time in a memory at the end point of the control flow graph.

In the method described in Non-patent Literature 2, an instrumentation code on edges with high execution frequencies is removed by using execution frequency information obtained by different approaches when the instrumentation code is placed by using the method described in Non-patent Literature 1. However, since the method described in Non-patent Literature 2 itself is a method of obtaining the execution frequency, there is a possibility of the execution frequency information being not usable or seriously low in accuracy. Also, in the method described in Non-patent Literature 2, the above-described path value is sampled at certain time intervals instead of being recorded in a memory every time. In the method described in Non-patent Literature 2, therefore, the overhead due to the instrumentation code becomes dominant as a result of largely reducing the overhead for recording to the memory and, in particular, the overhead in the case where insertion of the instrumentation code is accompanied by insertion of jump instructions is considerable.

An object of the present invention is to reduce the above-described overhead by minimizing the number of necessary jump instructions at the time of insertion of an instrumentation code for collection of profile information (for example, for calculation of path values in each of the methods described in Non-patent Literatures 1 and 2).

Non-patent Literatures 1 and 2 are incorporated herein by reference.

SUMMARY

The present invention provides a technique for obtaining execution frequency information on execution paths in a control flow graph. This technique may include a method for obtaining the execution frequency information, and a computer, computer program and computer program product for obtaining the execution frequency information.

In a first aspect according to the present invention, a method for obtaining execution frequency information on execution paths in a control flow graph, includes causing a computer to execute the steps of:

reading into a memory a source code to be complied;

preparing a control flow graph from the source code read into the memory, the preparing step including a step of modifying the control flow graph by assigning zero to an edge v→w between a basic block v in a precedent position (predecessor basic block) and a basic block w following the predecessor basic block v (successor basic block) in a case where the successor basic block w has a predecessor basic block x other than the predecessor basic block v, and where the successor basic block w exists on a fall-through path from the predecessor basic block x; and obtaining the execution frequency information by using the control flow graph modified by the modifying step.

In one embodiment of the present invention, the step of modifying the control flow graph may further include a step of inserting an instruction to add a path value in a successor basic block w' other than the successor basic block w in a case where the successor basic block w' other than the successor basic block w following the predecessor basic block v has no predecessor basic block other than the predecessor basic block v.

In one embodiment of the present invention, the step of modifying the control flow graph may further include a step of inserting a basic block m on an edge v→w' between the predecessor basic block v and a successor basic block w' other than the successor basic block w and inserting an instruction to add a path value in the basic block m in a case where the successor basic block w' other than the successor basic block w following the predecessor basic block v has a predecessor basic block y other than the predecessor basic block v.

In one embodiment of the present invention, the step of modifying the control flow graph may further include a step of inserting in the basic block m a jump instruction to make a jump to the successor basic block w' if the successor basic block w' exists on a fall-through path from the predecessor basic block y.

In one embodiment of the present invention, the step of modifying the control flow graph may further include a step of modifying the control flow graph by taking out one successor basic block wi from three or more successor basic blocks {w1, . . . , wn} if the three or more successor basic blocks {w1, . . . , wn} exist subsequently to the predecessor basic block v, provided that the successor basic block wi has a predecessor basic block x other than the predecessor basic block v existing as a successor basic block following the predecessor basic block v and exists on a fall-through path from the predecessor basic block x, and by assigning zero to an edge v→wi between the predecessor basic block v and the successor basic block wi taken out.

In one embodiment of the present invention, the step of modifying the control flow graph may further include a step of inserting a basic block n on an edge v→wj between the predecessor basic block v and a successor basic block wj other than the successor basic block wi to which zero is assigned, and inserting in the basic block n an instruction to add a path value.

In one embodiment of the present invention, the step of modifying the control flow graph may further include a step of inserting a jump instruction to make a jump to the successor basic block wj immediately after the instruction to add a path value if the successor basic block wj does not exist on the fall-through path from the predecessor basic block v, and if the successor basic block wj has a predecessor basic block other than the predecessor basic block v.

In one embodiment of the present invention, taking the one successor basic block wi satisfying the condition out of the three or more successor basic blocks {w1, . . . , wn} may further include a step of taking out the successor basic block wi with a higher execution frequency according to a state where the execution frequencies of some of the three or more successor basic blocks {w1, . . . , wn} are known.

In a second aspect according to the present invention, a computer for obtaining execution frequency information on execution paths in a control flow graph includes:
   a memory into which a source code to be complied is read;
   control flow graph preparation means for preparing a control flow graph from the source code read into the memory, the control flow graph preparation means including control flow graph modification means for modifying the control flow graph by assigning zero to an edge v→w between a predecessor basic block v and a successor basic block w following the predecessor basic block v in a case where the successor basic block w has a predecessor basic block x other than the predecessor basic block v, and where the successor basic block w exists on a fall-through path from the predecessor basic block x; and
   execution frequency information obtaining means for obtaining the execution frequency information by using the control flow graph modified by the control flow graph modification means.

In one embodiment of the present invention, the control flow graph modification means may insert an instruction to add a path value in a successor basic block w' other than the successor basic block w in a case where the successor basic block w' other than the successor basic block w following the predecessor basic block v has no predecessor basic block other than the predecessor basic block v.

In one embodiment of the present invention, the control flow graph modification means may insert a basic block m on an edge v→w' between a predecessor basic block y other than the predecessor basic block v and a successor basic block w' other than the successor basic block w and inserts an instruction to add a path value in the basic block m in a case where the successor basic block w' other than the successor basic block w following the predecessor basic block v has the predecessor basic block y other than the predecessor basic block v.

In one embodiment of the present invention, the control flow graph modification means may insert in the basic block m a jump instruction to make a jump to the successor basic block w' if the successor basic block w' exists on a fall-through path from the predecessor basic block y.

In one embodiment of the present invention, the control flow graph modification means may modify the control flow graph by taking out one successor basic block wi from three or more successor basic blocks {w1, . . . , wn} if the three or more successor basic blocks {w1, . . . , wn} exist subsequently to the predecessor basic block v, provided that the successor basic block wi has a predecessor basic block x other than the predecessor basic block v existing as a successor basic block following the predecessor basic block v and exists on a fall-through path from the predecessor basic block x, and by assigning zero to an edge v→wi between the predecessor basic block v and the successor basic block wi taken out.

In one embodiment of the present invention, the control flow graph modification means may insert an instruction to add a path value on an edge v→wj between the predecessor basic block v and a successor basic block wj other than the successor basic block wi to which zero is assigned.

In one embodiment of the present invention, the control flow graph modification means may insert a jump instruction to make a jump to the successor basic block wj immediately after the instruction to add a path value if the successor basic block wj does not exist on the fall-through path from the predecessor basic block v, and if the successor basic block wj has a predecessor basic block other than the predecessor basic block v.

In one embodiment of the present invention, taking the one successor basic block wi satisfying the condition out of the three or more successor basic blocks {w1, . . . , wn} may include taking out the successor basic block wi with a higher execution frequency according to a state where the execution frequencies of some of the three or more successor basic blocks {w1, . . . , wn} are known.

In a third aspect according to the present invention, a computer program or a computer program product for obtaining execution frequency information on execution paths in a control flow graph causes a computer to execute the steps according to the method in the first aspect.

The computer program according to the present invention may be stored on any computer-readable recording medium such as one of a plurality of flexible disks, an MO, a CD-ROM, a DVD, a BD, a hard disk device, a memory medium capable of being connected to a USB, a ROM, an MRAM or a RAM. The computer program may be downloaded from another computer, e.g., a server computer connected through a communication circuit to be stored on the above-described recording medium. The computer program may alternatively be duplicated from a different recording medium to be stored. The computer program according to the present invention may be compressed or divided into a plurality of segments to be stored on a single recording medium or a plurality of recording mediums. It is to be noted that the computer program product according to the present invention can of course be provided in various forms. The computer program product according to the present invention may include, for example, a storage medium on which the above-described computer program is recorded and a transmission medium for transmitting the above-described computer program.

In the above outline of the present invention, not all the necessary features of the present invention are enumerated. It is to be noted that combinations or subcombinations of the described components are also included in the present invention.

Needless to say, various modifications of the hardware components of the computer used in the embodiment of the present invention, which are made, for example, by using combinations of the components and a plurality of machines and by distributing the functions among the machines, can easily be thought of by those skilled in the art. Such modifications are conceptions included in the idea embodied in the present invention. However, the described components are illustrations and not all the components are essential to the prevent invention.

Also, the present invention can be implemented as hardware, software or a combination of hardware and software. As a typical example of carrying out of the invention by means of a combination of hardware and software, carrying out in a computer on which the above-described computer program is installed may be mentioned. In such a case, the computer program is loaded into the memory of the computer and executed. The computer program thereby controls the computer so that the computer executes processing according to the present invention. The computer program may be constituted by a group of instructions that can be expressed in a language, a code or a notation freely selected. Such a group of instructions directly enables the computer to perform certain functions to execute processing according the embodiment of the present invention or enables the computer to do so after one of: conversion into a different language, code or notation and duplication onto a different medium or both the conversion and duplication of the computer program is performed.

In the present invention, the number of jump instructions required when the above-described instrumentation code is inserted can be reduced, thereby reducing the overhead.

BRIEF DESCRIPTION OF THE DRAWINGS

FIG. 2D is a schematic diagram showing a state where a path value 0 is assigned to the edge v→w1 between the predecessor basic block v and the successor basic block w1 in a control flow graph before modification shown in FIG. 2D and a basic block q including an instruction to add a path value is inserted on the edge v→x between the predecessor basic block v and the successor basic block x in the embodiment of the present invention;

FIG. 4 shows an example of an algorithm for executing the processing for assigning a value to an edge requiring insertion of a new basic block in the processing for modifying the control flow graph in the embodiment of the present invention;

DETAILED DESCRIPTION

Figure 1:
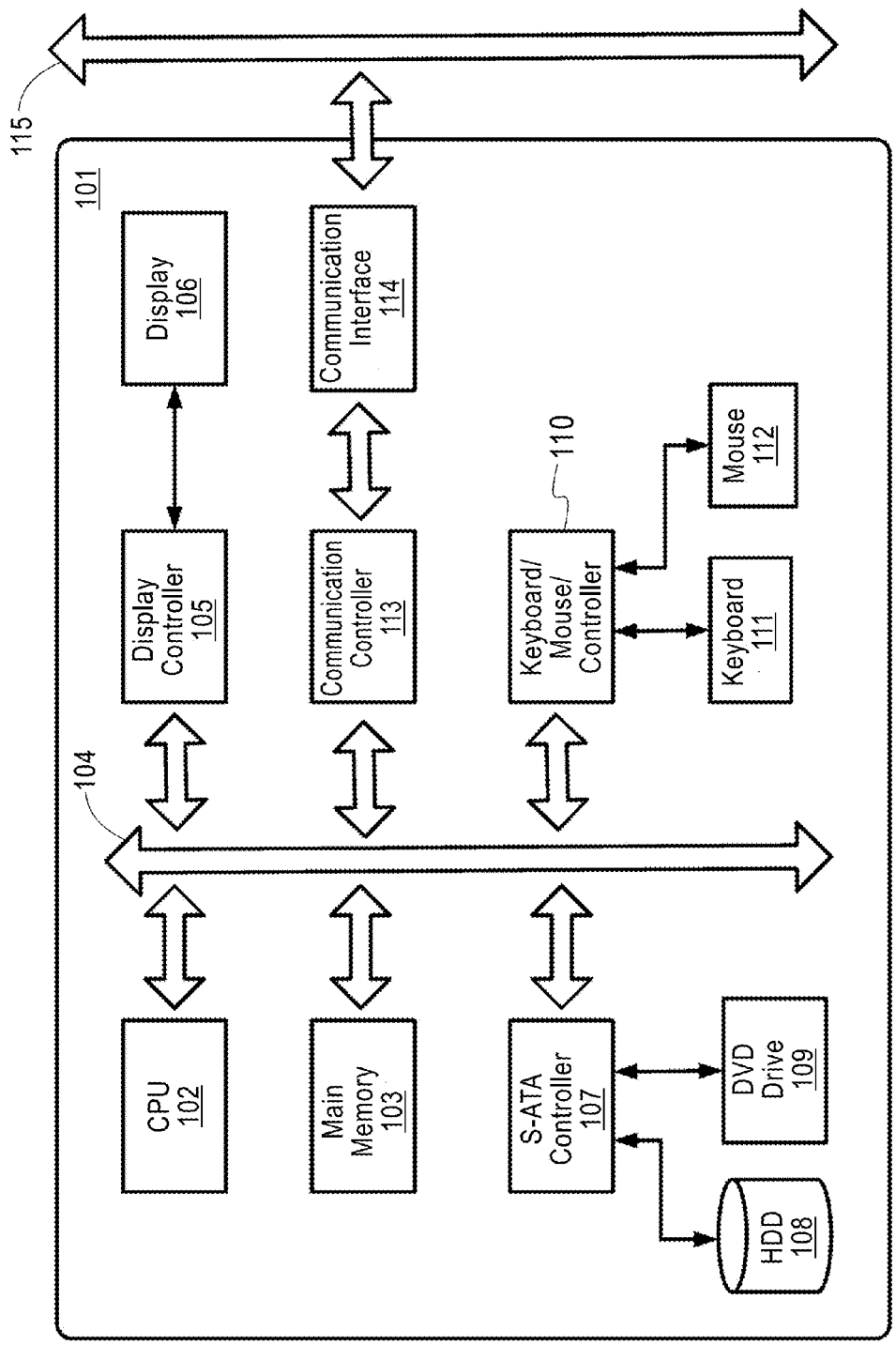
FIG. 1 is a diagram showing an example of a computer used in an embodiment of the present invention.

An embodiment of the present invention will be described with reference to the drawings. Through the figures referred to below, the same reference characters indicate the same objects unless otherwise specified. It is to be understood that the embodiment of the present invention is for explanation of a preferable aspect of the present invention with no intention of limiting the scope of the present invention to one described below.

A computer used in the embodiment of the present invention is not particularly specified if it is capable of obtaining execution frequency information on execution paths in a control flow graph. The computer may be, for example, a desktop computer, a notebook computer or an integrated personal computer, or a tablet terminal or a smart phone (e.g., a tablet terminal or a smart phone incorporating Windows (trademark), Android (trademark) or iOS).

FIG. 1 is a diagram showing an example of a computer used in the embodiment of the present invention.

A computer (101) has a CPU (102) and a main memory (103). These components are connected to a bus (104). The CPU (102) is preferably one based on a 32-bit or 64-bit architecture. The CPU (102) may be one in, for example, the Core (trademark) i series, Core (trademark) 2 series, Atom (trademark) series, Xeon (trademark) series, Pentium (trademark) series or Celeron (trademark) series from Intel Corporation, A series, Phenom (trademark) series, Athlon (trademark) series, Turion (trademark) series or Sempron (trademark) series from AMD (Advanced Micro Devices, Inc.), or Power (trademark) series from International Business Machines Corporation.

A display (106), e.g., a liquid crystal display (LCD) is connected to the bus (104) through a display controller (105). The liquid crystal display (LCD) may be, for example, a touch-panel display or floating touch display. The display (106) is used to display through a suitable graphical user interface an object to be displayed by the operation of a piece of software running on the computer (101) (e.g., a computer program in accordance with the embodiment of the present invention or any of various computer programs running on the computer (101)). The display (106) is capable of outputting execution frequency information on execution paths on control flow graphs modified in the embodiment of the present invention. The execution frequency information is, for example, information on how many times a branch is taken in a branch instruction in a machine code and how many times the branch is not taken in the instruction.

A disk (108), e.g., a hard disk or a solid-state drive (SSD) can arbitrarily be connected to the bus (104), for example, through a S-ATA or IDE controller (107).

A drive (109), e.g., a CD, DVD or BD drive can arbitrarily be connected to the bus (104), for example, through the S-ATA or IDE controller (107).

A keyboard (111) and a mouse (112) can arbitrarily be connected to the bus (104) through a peripheral device controller (110), e.g., a keyboard/mouse controller or a USB bus.

On the disk (108), an operating system, e.g., Windows (trademark), UNIX (trademark) or MacOS (trademark), programs for providing a Java (trademark) platform such as J2EE, a Java (trademark) application, a Java (trademark) virtual machine (VM) and a Java (trademark) Just-in-Time (JIT) compiler, a computer program according to the embodiment of the present invention, and other programs and data are stored so as to be downloadable to the main memory (103).

The disk (108) may be incorporated in the computer (101), connected through a cable so that the computer (101) can access the disk (108), or connected through a cable or wireless network so that the computer (101) can access the disk (108).

The drive (109) is used to install a program, for example, the operating system and an application or a computer program according to the embodiment of the present invention from a CD-ROM, a DVD-ROM or a BD onto the disk (108) when required.

A communication interface (114) conforms, for example, to the Ethernet (trademark) protocol. The communication interface (114) is connected to the bus (104) through a communication controller (113), serves for connection of the computer (101) to a communication circuit (115) in a cable or wireless connection manner, and provides a network interface layer for the TCP/IP protocol in the communication functions of the operating system for the computer (101). The communication circuit may be, for example, a wireless LAN environment based on a wireless LAN connection standard, a Wi-Fi wireless LAN environment such as IEEE802.11a/b/g/n, or a portable telephone network environment (e.g., a 3G or 4G environment).

Figure 2A:
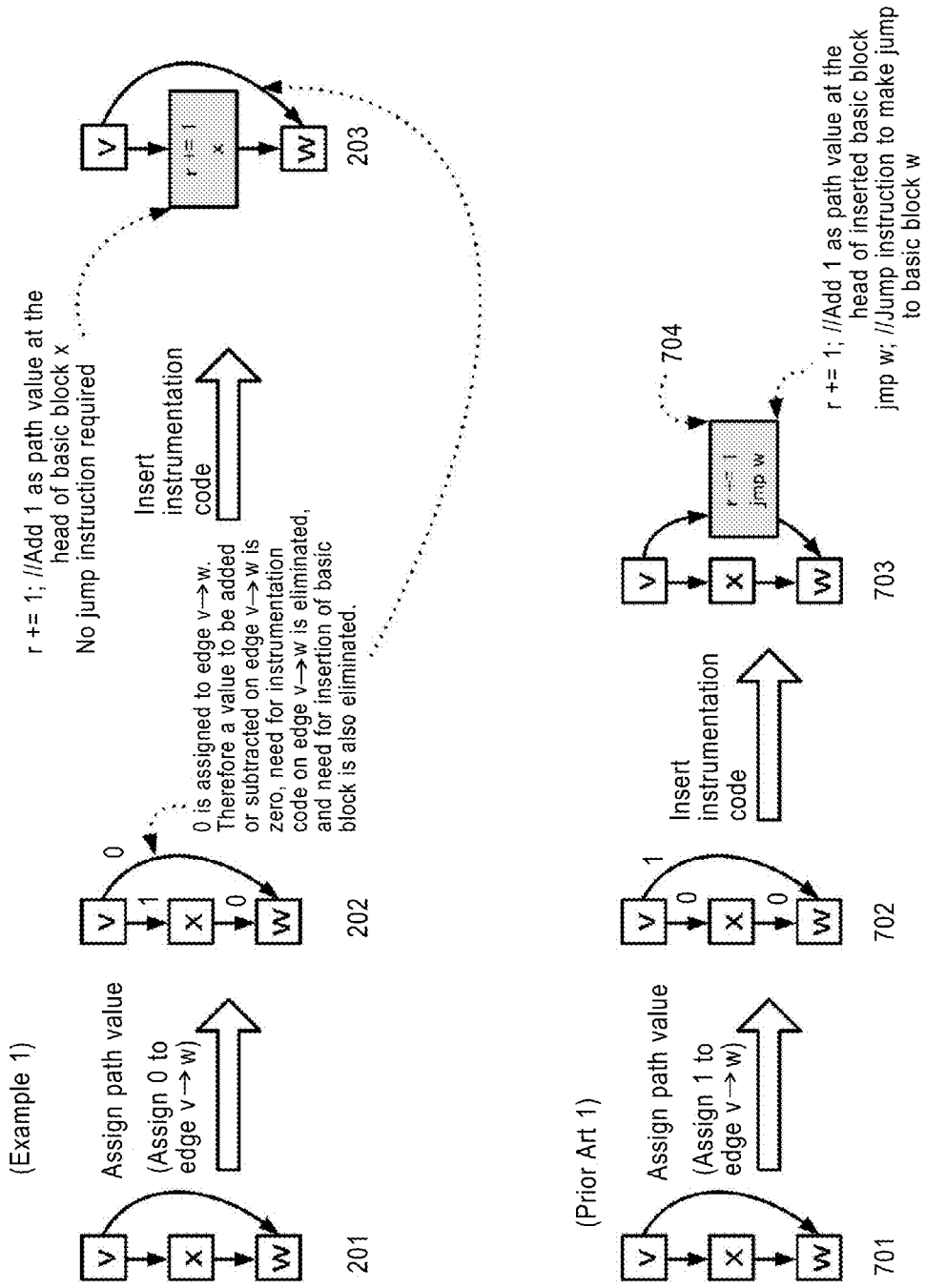
FIG. 2A is a schematic diagram showing a state where a path value 0 is assigned to an edge v→w between a predecessor basic block v and a successor basic block w in a control flow graph before modification shown in FIG. 2A and an instruction to add a path value in a successor basic block x in the embodiment of the present invention.
Figure 2B:
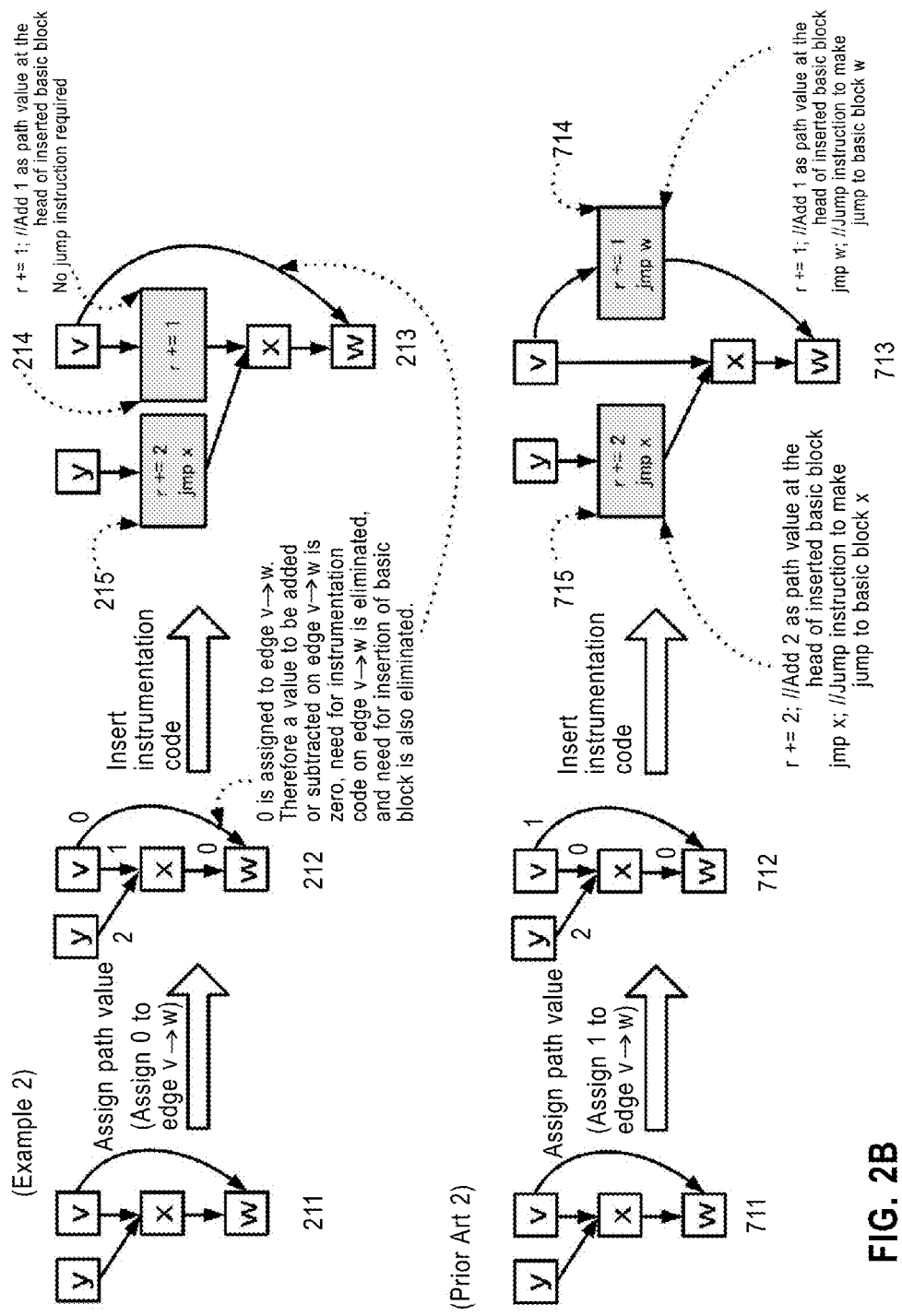
FIG. 2B is a schematic diagram showing a state where a path value 0 is assigned to the edge v→w between the predecessor basic block v and the successor basic block w in a control flow graph before modification shown in FIG. 2B and a basic block f including an instruction to add a path value is inserted on an edge v→x between the predecessor basic block v and the successor basic block x in the embodiment of the present invention.
Figure 2C:
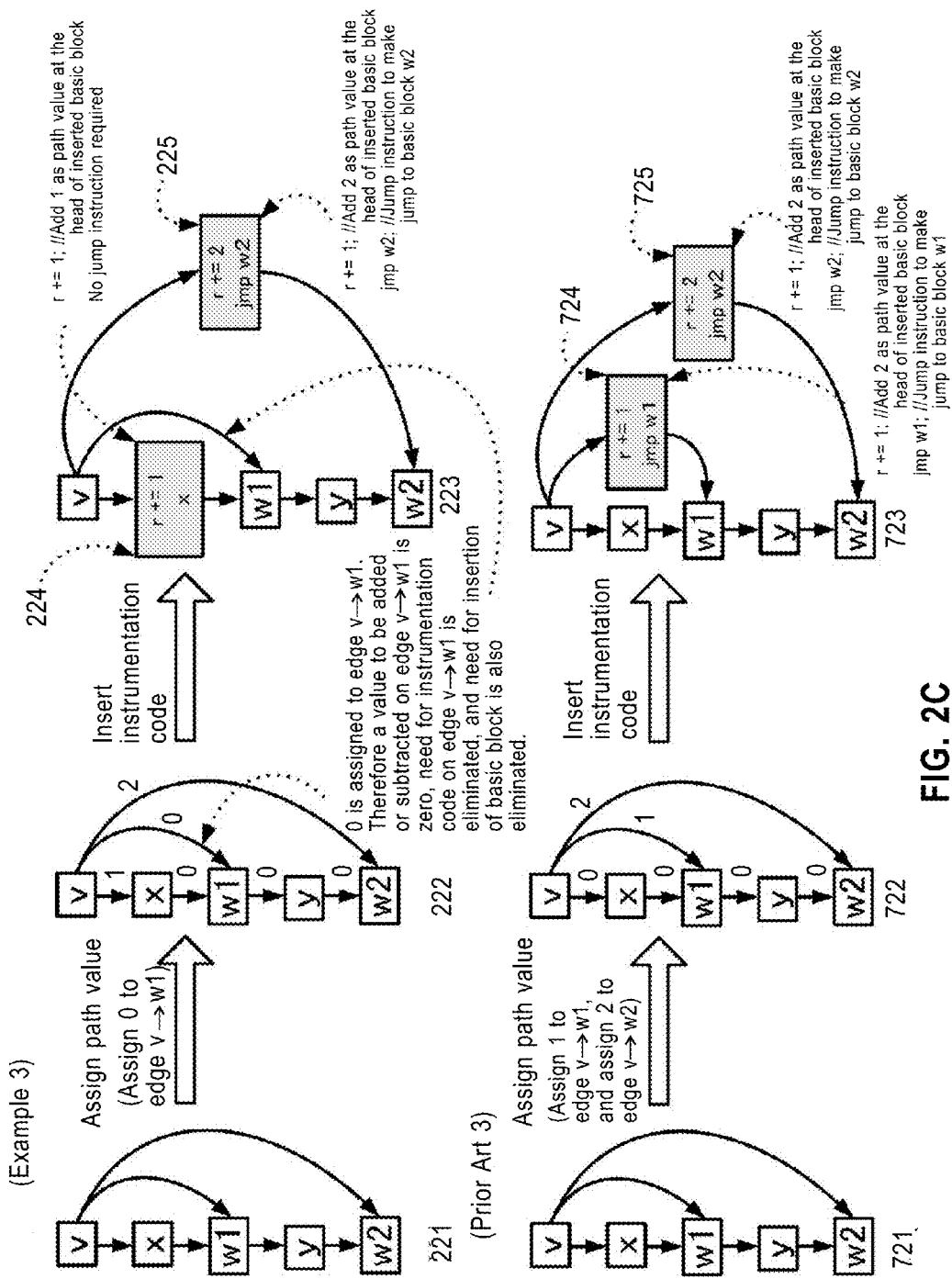
FIG. 2C is a schematic diagram showing a state where a path value 0 is assigned to an edge v→w1 between the predecessor basic block v and a successor basic block w1 in a control flow graph before modification shown in FIG. 2C and an instruction to add a path value in the successor basic block x in the embodiment of the present invention.

FIG. 2A (Example 1), FIG. 2B (Example 2), FIG. 2C (Example 3) and FIG. 2D (Example 4) show, in a case where a predecessor basic block x other than a predecessor basic block v precedes a successor basic block w, and the successor basic block w exists on a fall-through path from the predecessor basic block x, various aspects of modifying a control flow graph by assigning zero to an edge v→w between the predecessor basic block v and the successor basic block w. In the case where zero is assigned to the edge v→w, no instruction to add a path value to the edge v→w is added.

The various aspects of modifying control flow graphs are generally grouped into the following three aspects:

(1) an aspect in which if a successor basic block w' other than the successor basic block w following the predecessor basic block v has no predecessor basic block other than the predecessor basic block v, then an instruction to add a path value is inserted in the successor basic block w', (2) an aspect in which if a successor basic block w' other than the successor basic block w following the predecessor basic block v has a predecessor basic block y other than the predecessor basic block v, then a basic block m is inserted on an edge v→w' between the predecessor basic block v and the successor basic block w' and an instruction to add a path value is inserted in the basic block m, and (3) an aspect in which if three or more successor basic blocks {w1, . . . , wn} exist subsequently to the predecessor basic block v, then one successor basic block wi in the three or more successor basic blocks {w1, . . . , wn} is taken out provided that the successor basic block wi has a predecessor basic block x other than the predecessor basic block v existing as a successor basic block following the predecessor basic block v and exists on the fall-through path from the predecessor basic block x, and zero is assigned to an edge v→wi between the predecessor basic block v and the successor basic block wi taken out.

In the above-described aspect (1), if a successor basic block w' other than the successor basic block w following the predecessor basic block v has no predecessor basic block other than the predecessor basic block v, then an instruction to add a path value is inserted in the successor basic block w'. The aspect (1) corresponds to an aspect in Example 1 described below, in which a successor basic block x following a predecessor basic block v (which successor basic block x is also a predecessor basic block precedent to another successor basic block w, and which successor basic block x corresponds to the above-described successor basic block w') has no predecessor basic block other than the predecessor basic block v and, therefore, an instruction to add a path value is inserted in the successor basic block x (corresponding to the above-described successor basic block w'). Similarly, the aspect (1) corresponds to an aspect in Example 3 described below, in which a successor basic block x following a predecessor basic block v (which successor basic block x is also a predecessor basic block precedent to another successor basic block w1, and which successor basic block x corresponds to the above-described successor basic block w') has no predecessor basic block other than the predecessor basic block v and, therefore, an instruction to add a path value is inserted in the successor basic block x (corresponding to the above-described successor basic block w').

In the above-described aspect (2), if a successor basic block w' other than the successor basic block w following the predecessor basic block v has a predecessor basic block y other than the predecessor basic block v, then a basic block m is inserted on an edge v→w' between the predecessor basic block v and the successor basic block w' and an instruction to add a path value is inserted in the basic block m. The aspect (2) corresponds to an aspect in Example 2 described below, in which a successor basic block x following the predecessor basic block v (which successor basic block x is also a predecessor basic block precedent to another successor basic block w, and which successor basic block x corresponds to the above-described successor basic block w') has a predecessor basic block y other than the predecessor basic block v and, therefore, a basic block f (corresponding to the above-described basic block m) is inserted on an edge v→x (corresponding to the above-described edge v→w') between the above-described predecessor basic block v and the above-described successor basic block x (corresponding to the above-described successor basic block w') and an instruction to add a path value is inserted in the basic block f. Similarly, the aspect (2) corresponds to an aspect in Example 3 described below, in which a successor basic block w2 following the predecessor basic block v has a predecessor basic block y other than the predecessor basic block v and, therefore, a basic block p (corresponding to the above-described basic block m) is inserted on an edge v→w2 between the above-described predecessor basic block v and the above-described successor basic block w2 and an instruction to add a path value is inserted in the basic block p. Similarly, the aspect (2) corresponds to an aspect in Example 4 described below, in which a successor basic block x following the predecessor basic block v (which successor basic block x is also a predecessor basic block precedent to another successor basic block w1, and which successor basic block x corresponds to the above-described successor basic block w') has a predecessor basic block y other than the predecessor basic block v and, therefore, a basic block q (corresponding to the above-described basic block m) is inserted on an edge v→x (corresponding to the above-described edge v→w') between the above-described predecessor basic block v and the above-described successor basic block x (corresponding to the above-described successor basic block w') and an instruction to add a path value is inserted in the basic block q, and corresponds to another aspect in Example 4 in which a successor basic block w2 following the predecessor basic block v has a predecessor basic block y other than the predecessor basic block v and, therefore, a basic block r (corresponding to the above-described basic block m) is inserted on an edge v→w2 between the above-described predecessor basic block v and the above-described successor basic block w2 and an instruction to add a path value is inserted in the basic block r.

In the above-described aspect (3), if three or more successor basic blocks {w1, ..., wn} exist following the predecessor basic block v, then one successor basic block wi in the three or more successor basic blocks {w1, ..., wn} is taken out provided that the successor basic block wi has a predecessor basic block x other than the predecessor basic block v existing as a successor basic block following the predecessor basic block v and exists on the fall-through path from the predecessor basic block x, and zero is assigned to an edge v→wi between the predecessor basic block v and the successor basic block wi taken out. The above-described aspect (3) corresponds to another aspect in Example 3 described below, in which three successor basic blocks {x, w1 and w2} exist subsequently to the predecessor basic block v; one successor basic block w1 in the three successor basic blocks {x, w1 and w2} is therefore taken out provided that the successor basic block w1 has a predecessor basic block x other than the predecessor basic block v following the predecessor basic block v (which predecessor basic block x is also a successor basic block following the predecessor basic block v, and which predecessor basic block x, therefore, is also the above-described successor basic block x) and exists on the fall-through path from the predecessor basic block x; and zero is assigned to an edge v→w1 between the predecessor basic block v and the successor basic block w1 taken out. Similarly, the above-described aspect (3) corresponds to another aspect in Example 4 described below, in which three successor basic blocks {x, w1 and w2} exist subsequently to the predecessor basic block v; one successor basic block w1 in the three successor basic blocks {x, w1 and w2} is therefore taken out provided that the successor basic block w1 has a predecessor basic block x other than the predecessor basic block v following the predecessor basic block v (which predecessor basic block x is also a successor basic block following the predecessor basic block v, and which predecessor basic block x, therefore, is also the above-described successor basic block x) and exists on the fall-through path from the predecessor basic block x; and zero is assigned to an edge v→w1 between the predecessor basic block v and the successor basic block w1 taken out.

FIGS. 2(A) to 2(D) are schematic diagrams showing assignment of 0 to the edge between the predecessor basic block v and the successor basic block w or w1 and insertion of an instrumentation code in accordance with the embodiment of the present invention in control flow graphs (201, 211, 221, and 231) before modification respectively shown in FIGS. 2(A) to 2(D). Description will be made below of how the control flow graphs (201, 211, 221, and 231) respectively shown in FIGS. 2(A) to 2(D) are modified by insertion of the instrumentation code in accordance with the embodiment of the present invention.

Figure 7A:
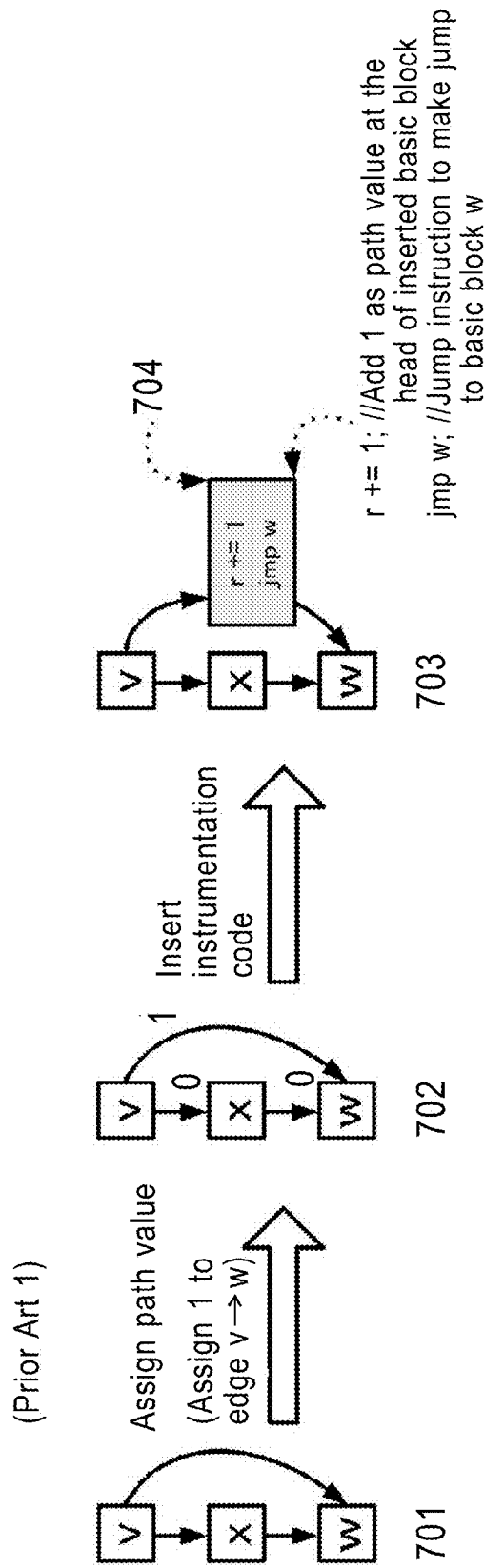
FIG. 7A is a schematic diagram showing a state where 1 is assigned to the edge v→w between the predecessor basic block v and the successor basic block w in a control flow graph before modification shown in FIG. 7A and an instrumentation code is inserted in the prior art.

Referring to FIG. 2A (Example 1), the control flow graph (201) before modification is the same as the control flow graph (701) shown in FIG. 7A. The description of the control flow graph (701) shown in FIG. 7A should therefore be referred to as description of the control flow graph (201) before modification.

With respect to the control flow graph (201) before modification, the computer (101) determines that the predecessor basic block x other than the predecessor basic block v precedes the successor basic block w following the predecessor basic block v, and that the successor basic block w exists on the fall-through path from the predecessor basic block x. The fall-through path is not a destination to be reached by a skip through a branch but a path through which a transition is made without any branch or when no branch is established. Accordingly, the computer (101) assigns a path value 0 to the edge v→w between the predecessor basic block v and the successor basic block w in the control flow graph (201) before modification. The computer (101) also assigns a path value 1 to the edge v→x between the predecessor basic block v and the successor basic block x (which is also a predecessor basic block precedent to another successor basic block w, and which is also referred to as the above-described precedent basic block x). The computer also assigns a path value 0 to the other edge. Accordingly, in a control flow graph (202), the path value 0 is assigned to the edge v→w and the path value 1 is assigned to the edge v→x.

Next, the computer (101) performs an operation to insert the instrumentation code in the control flow graph (202).

Since the path value 0 is assigned to the edge v→w between the predecessor basic block v and the successor basic block w (that is, a value to be added or subtracted on the edge v→w is 0), the computer (101) determines that there is no need to insert any instrumentation code on the edge v→w. The computer (101) also determines that there is no need to insert any basic block on the edge v→w. Similarly, the computer (101) determines that there is no need to insert any instrumentation code with respect to the other edge to which the path value 0 is assigned.

Since the path value 1 is assigned to the edge v→x, the computer (101) inserts an instruction to add the path value (r+=1) in the successor basic block x, for example, at the head of the same. The computer (101) inserts no jump instruction in the successor basic block x since no jump instruction is required in the successor basic block x.

As described above, in Example 1, the successor basic block x following the predecessor basic block v (which successor basic block x is also a predecessor basic block precedent to the another successor basic block w, and which successor basic block x corresponds to the above-described successor basic block w') has no predecessor basic block other than the predecessor basic block v. The computer (101) therefore inserts an instruction to add a path value in the successor basic block x (corresponding to the above-described successor basic block w').

As a result, in a modified control flow graph (203) shown in FIG. 2A, the number of jump instructions is not increased by insertion of the instrumentation code. On the other hand, in the modified control flow graph (703) shown in FIG. 7A, the number of jump instructions is increased by 1 (jmp w) (704)

as a result of insertion of the instrumentation code. Thus, in the case of modification of the control flow graph (201) into the control flow graph (203) in accordance with the embodiment of the present invention, the number of jump instructions can be reduced (from 1 to 0) in comparison with the method according to Prior Art 1 shown in FIG. 7A, thereby reducing the overhead.

Figure 7B:
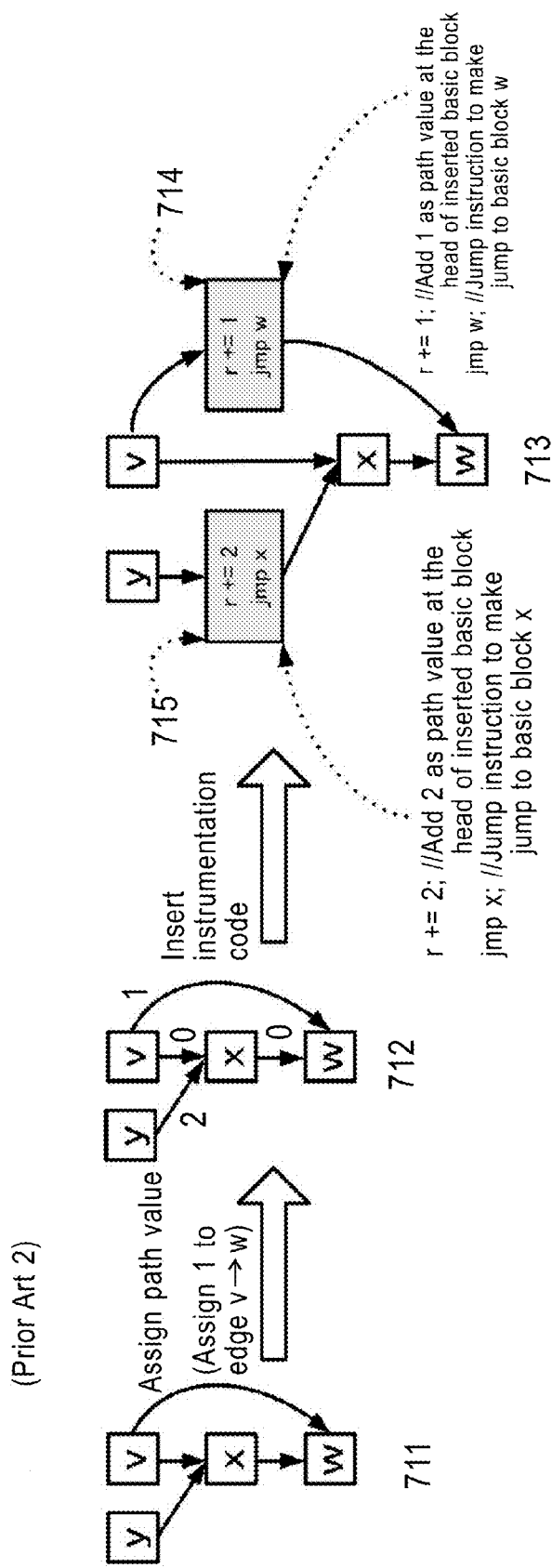
FIG. 7B is a schematic diagram showing a state where 1 is assigned to the edge v→w between the predecessor basic block v and the successor basic block w in a control flow graph before modification shown in FIG. 7B and the instrumentation code is inserted in the prior art.

Referring to FIG. 2B (Example 2), the control flow graph (211) before modification is the same as the control flow graph (711) shown in FIG. 7B. The description of the control flow graph (711) shown in FIG. 7B should therefore be referred to as description of the control flow graph (211) before modification.

With respect to the control flow graph (211) before modification, the computer (101) determines that the predecessor basic block x other than the predecessor basic block v precedes the successor basic block w following the predecessor basic block v, and that the successor basic block w exists on the fall-through path from the predecessor basic block x. Accordingly, the computer (101) assigns a path value 0 to the edge v→w between the predecessor basic block v and the successor basic block w in the control flow graph (211) before modification. The predecessor basic block y precedes the successor basic block x (which is also a predecessor basic block precedent to the other successor basic block w, and which is also referred to as the above-described predecessor basic block x). The computer (101) therefore assigns a path value 1 to the edge v→x between the predecessor basic block v and the successor basic block x and assigns a path value 2 to the edge y→x between the predecessor basic block y and the successor basic block x. The computer also assigns a path value 0 to the other edge. Accordingly, in a control flow graph (212), the path value 0 is assigned to the edge v→w; the path value 1, to the edge v→x; and the path value 2, to the edge y→x.

Next, the computer (101) performs an operation to insert the instrumentation code in the control flow graph (212).

Since the path value 0 is assigned to the edge v→w between the predecessor basic block v and the successor basic block w (that is, a value to be added or subtracted on the edge v→w is 0), the computer (101) determines that there is no need to insert any instrumentation code on the edge v→w. The computer (101) also determines that there is no need to insert any basic block on the edge v→w. Similarly, the computer (101) determines that there is no need to insert any instrumentation code with respect to the other edge to which the path value 0 is assigned.

Since the path value 1 is assigned to the edge v→x between the predecessor basic block v and the successor basic block x, and since the predecessor basic block y precedes the successor basic block x, the computer (101) inserts on the edge v→x a basic block f (214) including an instruction to add the path value (r+=1). The computer (101) inserts no jump instruction in the inserted basic block f (214) since no jump instruction is required in the inserted basic block f (214). That is, the inserted basic block f (214) includes no jump instruction.

Similarly, since the path value 2 is assigned to the edge y→x between the predecessor basic block y and the successor basic block x, the computer (101) inserts on the edge y→x a basic block g (215) including an instruction to add the path value (r+=2). The inserted basic block g (215) includes a jump instruction (jmp x) to make a jump to the successor basic block x as well as the instruction to add the path value (r+=2).

As described above, in Example 2, the successor basic block x following the predecessor basic block v (which successor basic block x is also a predecessor basic block precedent to the another successor basic block w, and which successor basic block x corresponds to the above-described successor basic block w') has the predecessor basic block y other than the predecessor basic block v. The computer (101) therefore inserts the basic block f (corresponding to the above-described basic block m) on the edge v→x (corresponding to the above-described edge v→w') between the above-described predecessor basic block v and the above-described successor basic block x (corresponding to the above-described successor basic block w'), and inserts an instruction to add a path value in this basic block f.

As a result, in a modified control flow graph (213) shown in FIG. 2B, the number of jump instructions is increased by one (jmp x) (215) as a result of insertion of the instrumentation code. On the other hand, in the modified control flow graph (713) shown in FIG. 7B, the number of jump instructions is increased by 2 (jmp w and jmp x) (714 and 715, respectively) as a result of insertion of the instrumentation code. Thus, in the case of modification of the control flow graph (211) into the control flow graph (213) in accordance with the embodiment of the present invention, the number of jump instructions can be reduced by one (from 2 to 1) in comparison with the method according to Prior Art 2 shown in FIG. 7B, thereby reducing the overhead.

Figure 7C:
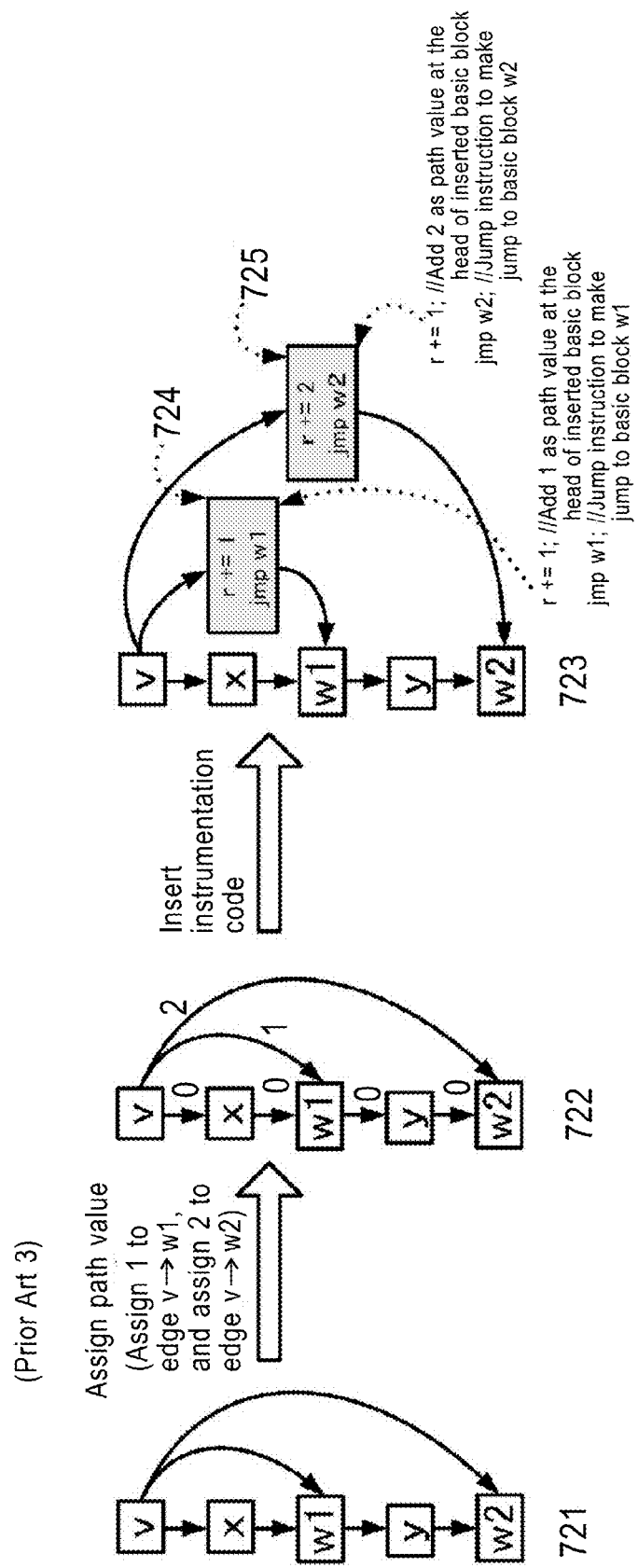
FIG. 7C is a schematic diagram showing a state where 1 is assigned to the edge v→w1 between the predecessor basic block v and the successor basic block w1 in a control flow graph before modification shown in FIG. 7C and the instrumentation code is inserted in the prior art.

Referring to FIG. 2C (Example 3), the control flow graph (221) before modification is the same as the control flow graph (721) shown in FIG. 7C. The description of the control flow graph (721) shown in FIG. 7C should therefore be referred to as description of the control flow graph (221) before modification.

With respect to the control flow graph (221) before modification, the computer (101) determines that the predecessor basic block x other than the predecessor basic block v precedes the successor basic block w1 following the predecessor basic block v, and that the successor basic block w1 exists on the fall-through path from the predecessor basic block x. Accordingly, the computer (101) assigns a path value 0 to the edge v→w1 between the predecessor basic block v and the successor basic block w1 in the control flow graph (221) before modification. The computer (101) also assigns a path value 1 to the edge v→x between the predecessor basic block v and the successor basic block x (which is also a predecessor basic block precedent to the another successor basic block w and also referred to as the above-described predecessor basic block x) and assigns a path value 2 to the edge v→w2 between the predecessor basic block v and the successor basic block w2. The computer also assigns a path value 0 to the other edges. Accordingly, in a control flow graph (222), the path value 0 is assigned to the edge v→w1; the path value 1, to the edge v→x; and the path value 2, to the edge v→w2.

Next, the computer (101) performs an operation to insert the instrumentation code in the control flow graph (222).

Since the path value 0 is assigned to the edge v→w1 between the predecessor basic block v and the successor basic block w1 (that is, a value to be added or subtracted on the edge v→w1 is 0), the computer (101) determines that there is no need to insert any instrumentation code on the edge v→w1. The computer (101) also determines that there is no need to insert any basic block on the edge v→w1. Similarly, the computer (101) determines that there is no need to insert any instrumentation code with respect to the other edges to which the path value 0 is assigned.

Since the path value 1 is assigned to the edge v→x between the predecessor basic block v and the successor basic block x, the computer (101) inserts an instruction to add the path value (r+=1) in the successor basic block x, for example, at the head of the same.

Similarly, since the path value 2 is assigned to the edge v→w2 between the predecessor basic block v and the successor basic block w2, the computer (101) inserts on the edge v→w2 a basic block p (225) including an instruction to add the path value (r+=2). The inserted basic block p (225) includes a jump instruction (jmp w2) to make a jump to the successor basic block w2 as well as the instruction to add the path value (r+=2).

As described above, in Example 3, the successor basic block x following the predecessor basic block v (which successor basic block x is also a predecessor basic block precedent to the another successor basic block w1, and which successor basic block x corresponds to the above-described successor basic block w') has no predecessor basic block other than the predecessor basic block v. The computer (101) therefore inserts an instruction to add a path value in the successor basic block x (corresponding to the above-described successor basic block w').

Also, in Example 3, the successor basic block w2 following the predecessor basic block v has the predecessor basic block y other than the predecessor basic block v. The computer (101) therefore inserts the basic block p (corresponding to the above-described basic block m) on the edge v→w2 between the predecessor basic block v and the predecessor basic block w2, and inserts in the basic block p an instruction to add a path value.

Also, in Example 3, the predecessor basic block w2 (corresponding to the successor basic block w') exists on the fall-through path from the predecessor basic block y. The computer (101) therefore inserts in the above-described basic block p (corresponding to the above-described basic block m) a jump instruction to make a jump to the basic block w2.

Also, in Example 3, the three successor basic blocks {x, w1, and w2} exist subsequently to the predecessor basic block v. The computer (101) therefore takes out one successor basic block w1 in the three successor basic blocks {x, w1, and w2} provided that the successor basic block w1 has a predecessor basic block x other than the predecessor basic block v following the predecessor basic block v (which predecessor basic block x is also a successor basic block following the predecessor basic block v, and which predecessor basic block x, therefore, is also the above-described successor basic block x) and exists on the fall-through path from the predecessor basic block x, and assigns zero to the edge v→w1 between the predecessor basic block v and the successor basic block w1 taken out.

Also, in Example 3, the computer (101) inserts the basic block p (corresponding to the above-described basic block n) on the edge v→w2 between the predecessor basic block v and the successor basic block w2 other than the successor basic block w1 to which zero is assigned as described above, and inserts an instruction to add a path value in the basic block p.

Also, in Example 3, the successor basic block w2 does not exist on the fall-through path from the predecessor basic block v, and the successor basic block w2 has the predecessor basic block y other than the predecessor basic block v. The computer (101) therefore inserts immediately after the instruction to add a path value in the above-described basic block p (corresponding to the above-described basic block n) a jump instruction to make a jump to the successor basic block w2.

As a result, in a modified control flow graph (223) shown in FIG. 2C, the number of jump instructions is increased by one (jmp w2) (225) as a result of insertion of the instrumentation code. On the other hand, in the modified control flow graph (723) shown in FIG. 7C, the number of jump instructions is increased by 2 (jmp w1 and jmp w2) (724 and 725, respectively) as a result of the insertion of the instrumentation code. Thus, in the case of modification of the control flow graph (221) into the control flow graph (223) in accordance with the embodiment of the present invention, the number of jump instructions can be reduced by one (from 2 to 1) in comparison with the method according to Prior Art 3 shown in FIG. 7C, thereby reducing the overhead.

An example has been described with reference to FIG. 2C in which the path value 0 is assigned to the edge v→w1 between the predecessor basic block v and the successor basic block w1. That is, an example has been described in which three successor blocks {x, w1, and w2} exist subsequently to the predecessor basic block v; one successor basic block w1 in the three successor basic blocks {x, w1, and w2} is therefore taken out provided that the successor basic block w1 has a predecessor basic block x other than the predecessor basic block v following the predecessor basic block v (which predecessor basic block x is also a successor basic block following the predecessor basic block v, and which predecessor basic block x, therefore, is also the above-described successor basic block x) and exists on the fall-through path from the predecessor basic block x; and zero is assigned to the edge v→w1 between the predecessor basic block v and the successor basic block w1 taken out.

Alternatively, in a case where a plurality of successor basic blocks {w1, ..., wn} exist subsequently to the predecessor basic block v, one successor basic block wi in the three or more successor basic blocks {w1, ..., wn} can be taken out provided that the successor basic block wi has a predecessor basic block x other than the predecessor basic block v following the predecessor basic block v (which predecessor basic block x is also a successor basic block following the predecessor basic block v, and which predecessor basic block x, therefore, is also the above-described successor basic block x) and exists on the fall-through path from the predecessor basic block x, and zero can be assigned to the edge v→wi between the above-described predecessor basic block v and the successor basic block wi taken out. Taking the above-described successor basic block wi satisfying the above-described condition out of the plurality of successor basic blocks {w1, ..., wn} is performed, for example, by taking out the successor basic block wi with a higher execution frequency according to a state where the execution frequencies of some of the plurality of successor basic blocks {w1, ..., wn} are known (for example, in a case where the execution frequencies of some of the plurality of successor basic blocks {w1, ..., wn} are determined in advance by some other method).

Figure 7D:
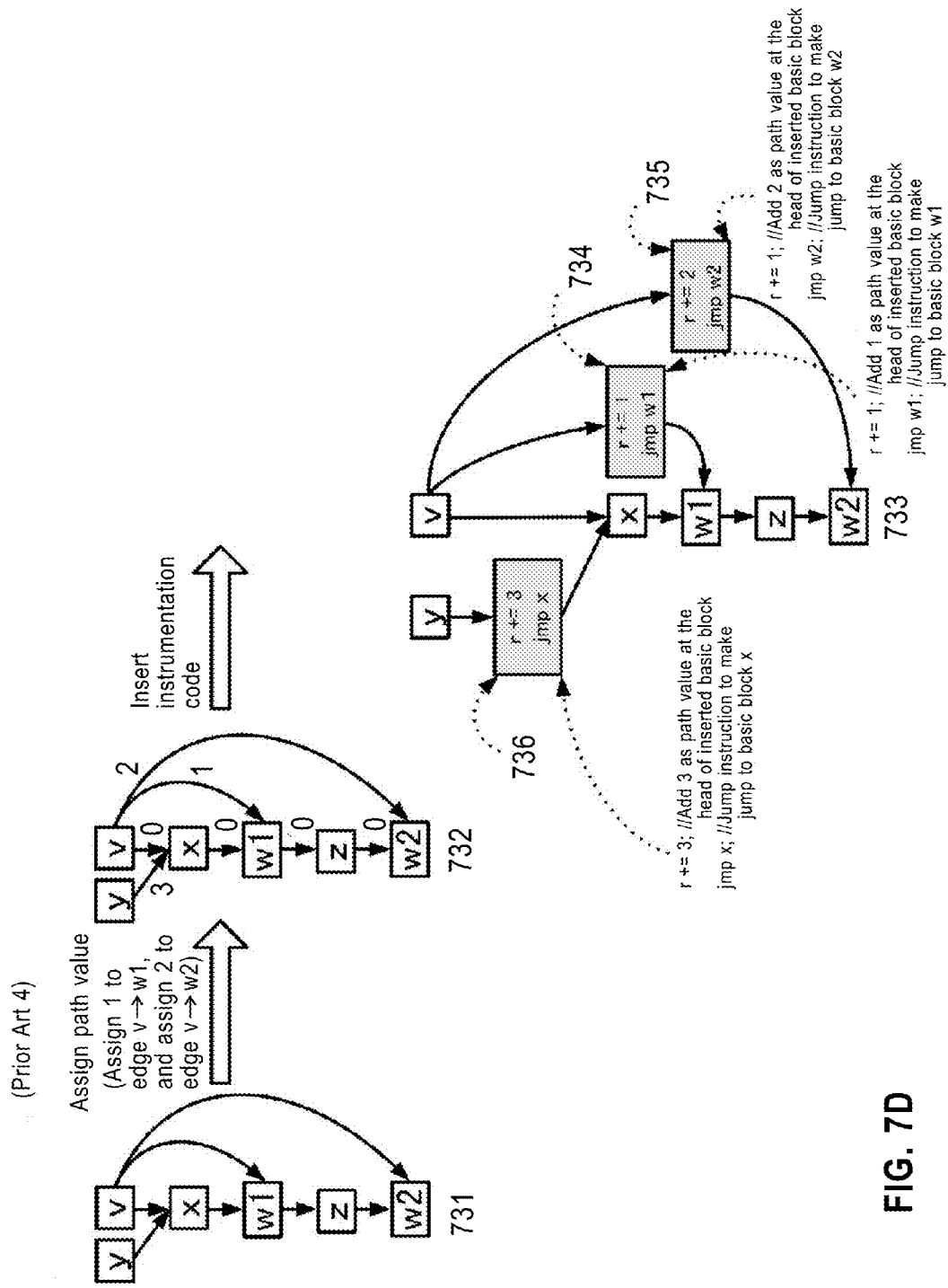
FIG. 7D is a schematic diagram showing a state where 1 is assigned to the edge v→w1 between the predecessor basic block v and the successor basic block w1 in a control flow graph before modification shown in FIG. 7D and the instrumentation code is inserted in the prior art.

Referring to FIG. 2D (Example 4), the control flow graph (231) before modification is the same as the control flow graph (731) shown in FIG. 7D. The description of the control flow graph (731) shown in FIG. 7D should therefore be referred to as description of the control flow graph (231) before modification.

With respect to the control flow graph (231) before modification, the computer (101) determines that the predecessor basic block x other than the predecessor basic block v precedes the successor basic block w1 following the predecessor basic block v, and that the successor basic block w1 exists on the fall-through path from the predecessor basic block x. Accordingly, the computer (101) assigns a path value 0 to the edge v→w1 between the predecessor basic block v and the successor basic block w1 in the control flow graph (231) before modification. The computer (101) also assigns a path value 1 to the edge v→x between the predecessor basic block v and the successor basic block x (which is also a predecessor basic block precedent to the another successor basic block w, and which is also referred to as the above-described predecessor basic block x), assigns a path value 2 to the edge v→w2 between the predecessor basic block v and the successor basic block w2, and assigns a path value 3 to the edge y→x between the predecessor basic block y and the successor basic block x. The computer also assigns a path value 0 to the other edges. Accordingly, in a control flow graph (232), the path value 0 is assigned to the edge v→w1; the path value 1, to the edge v→x; the path value 2, to the edge v→w2; and the path value 3, to the edge y→x.

Next, the computer (101) performs an operation to insert the instrumentation code in the control flow graph (232).

Since the path value 0 is assigned to the edge v→w1 between the predecessor basic block v and the successor basic block w1 (that is, a value to be added or subtracted on the edge v→w1 is 0), the computer (101) determines that there is no need to insert any instrumentation code on the edge v→w1. The computer (101) also determines that there is no need to insert any basic block on the edge v→w1. Similarly, the computer (101) determines that there is no need to insert any instrumentation code with respect to the other edges to which the path value 0 is assigned.

Since the path value 1 is assigned to the edge v→x between the predecessor basic block v and the successor basic block x, and since the predecessor basic block y precedes the successor basic block x, the computer (101) inserts a basic block q (234) including an instruction to add the path value (r+=1) on the edge v→x. The computer (101) inserts no jump instruction in the inserted basic block q (234) since no jump instruction is required in the inserted basic block q.

Similarly, since the path value 2 is assigned to the edge v→w2 between the predecessor basic block v and the successor basic block w2, the computer (101) inserts a basic block r (235) including an instruction to add the path value (r+=2) on the edge v→w2. The inserted basic block r (235) includes a jump instruction to make a jump to the predecessor basic block w2 (jmp w2) as well as the instruction to add the path value (r+=2).

Similarly, since the path value 3 is assigned to the edge y→x between the predecessor basic block y and the successor basic block x, the computer (101) inserts basic block s (236) including an instruction to add the path value (r+=3) on the edge y→x. The inserted basic block s (236) includes a jump instruction to make a jump to the predecessor basic block x (jmp x) as well as the instruction to add the path value (r+=3).

As described above, in Example 4, the successor basic block x following the predecessor basic block v (which successor basic block x is also a predecessor basic block precedent to the another successor basic block w1, and which successor basic block x corresponds to the above-described successor basic block w') has the predecessor basic block y other than the predecessor basic block v. The computer (101) therefore inserts the basic block q (corresponding to the above-described basic block m) on the edge v→x (corresponding to the above-described edge v→w') between the above-described predecessor basic block v and the above-described successor basic block x (corresponding to the above-described successor basic block w'), and inserts an instruction to add a path value in the basic block q. Also, in Example 4, the successor basic block w2 following the predecessor basic block v has the predecessor basic block y other than the predecessor basic block v, the computer (101) therefore inserts the basic block r (corresponding to the above-described basic block m) on the edge v→w2 between the predecessor basic block v and the successor basic block w2, and inserts an instruction to add a path value in the basic block r.

Further, in Example 4, the successor basic block w2 (corresponding to the above-described successor basic block w') exists on the fall-through path from a predecessor basic block z. The computer (101) therefore inserts in the above-described basic block r (corresponding to the above-described basic block m) a jump instruction to make a jump to the basic block w2.

Also, in Example 4, the three successor basic blocks {x, w1, and w2} exist subsequently to the predecessor basic block v. The computer (101) therefore takes out one successor basic block w1 in the three successor basic blocks {x, w1, and w2} provided that the successor basic block w1 has a predecessor basic block x other than the predecessor basic block v following the predecessor basic block v (which predecessor basic block x is also a successor basic block following the predecessor basic block v, and which predecessor basic block x, therefore, is also the above-described successor basic block x) and exists on the fall-through path from the predecessor basic block x, and assigns zero to the edge v→w1 between the predecessor basic block v and the successor basic block w1 taken out.

Also, in Example 4, the computer (101) inserts the basic block r (corresponding to the above-described basic block n) on the edge v→w2 between the predecessor basic block v and the successor basic block w2 other than the successor basic block w1 to which zero is assigned as described above, and inserts an instruction to add a path value in the basic block r.

Also, in Example 4, the successor basic block w2 does not exist on the fall-through path from the predecessor basic block v, and the successor basic block w2 has the predecessor basic block z other than the predecessor basic block v. The computer (101) therefore inserts immediately after the instruction to add a path value in the above-described basic block r (corresponding to the above-described basic block n) a jump instruction to make a jump to the successor basic block w2.

As a result, in a modified control flow graph (233) shown in FIG. 2D, the number of jump instructions is increased by two (jmp w2 and jmp x) (235 and 236) as a result of insertion of the instrumentation code. On the other hand, in the modified control flow graph (733) shown in FIG. 7D, the number of jump instructions is increased by 3 (jmp w1, jmp w2, and jmp x) (734, 735, and 736, respectively) as a result of insertion of the instrumentation code. Thus, in the case of modification of the control flow graph (231) into the control flow graph (233) in accordance with the embodiment of the present invention, the number of jump instructions can be reduced by one (from 3 to 2) in comparison with the method according to Prior Art 4 shown in FIG. 7D, thereby reducing the overhead.

An example has been described with reference to FIG. 2D in which the path value 0 is assigned to the edge v→w1 between the predecessor basic block v and the successor basic block w1. That is, an example has been described in which three successor blocks {x, w1, and w2} exist subsequently to the predecessor basic block v; one successor basic block w1 in the three successor basic blocks {x, w1, and w2} is therefore taken out provided that the successor basic block w1 has a predecessor basic block x other than the predecessor basic block v following the predecessor basic block v (which predecessor basic block x is also a successor basic block following the predecessor basic block v, and which predecessor basic block x, therefore, is also the above-described successor basic block x) and exists on the fall-through path from the predecessor basic block x; and zero is assigned to the edge v→w1 between the predecessor basic block v and the successor basic block w1 taken out.

Alternatively, in a case where a plurality of successor basic blocks {w1, ..., wn} exist subsequently to the predecessor basic block v, one successor basic block wi in the plurality of successor basic blocks {w1, ..., wn} can be taken out provided that the successor basic block wi has a predecessor basic block x other than the predecessor basic block v following the predecessor basic block v (which predecessor basic block x is also a successor basic block following the predecessor basic block v, and which predecessor basic block x, therefore, is also the above-described successor basic block x) and exists on the fall-through path from the predecessor basic block x, and zero can be assigned to the edge v→wi between the above-described predecessor basic block v and the successor basic block wi taken out. Taking the above-described successor basic block wi satisfying the above-described condition out of the plurality of successor basic blocks {w1, ..., wn} is performed, for example, by taking out the successor basic block wi with a higher execution frequency according to a state where the execution frequencies of some of the plurality of successor basic blocks {w1, ..., wn} are known (for example, in a case where the execution frequencies of some of the plurality of successor basic blocks {w1, ..., wn} are determined in advance by some other method).

Figure 3A:
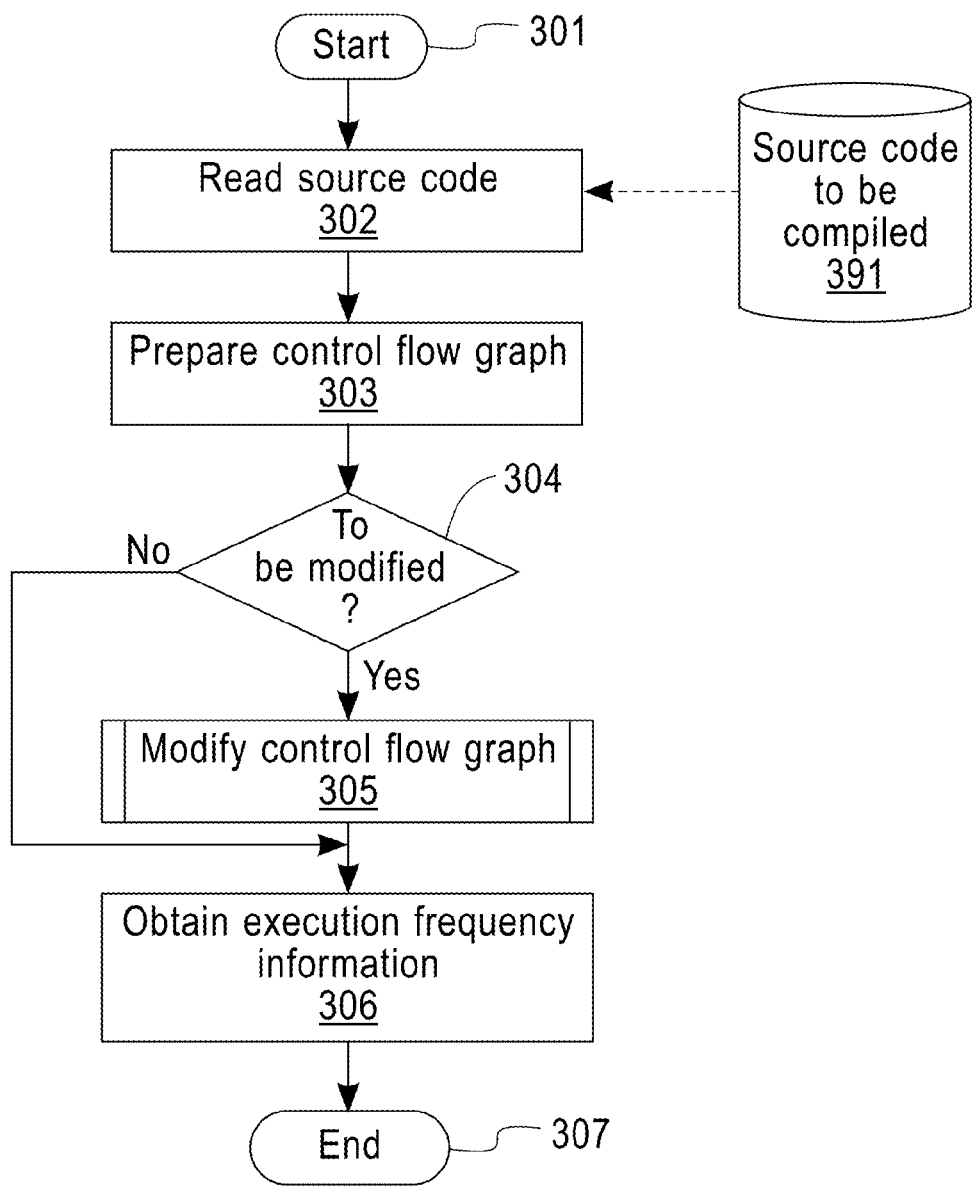
FIG. 3A is a flowchart for processing for obtaining execution frequency information on execution paths in the control flow graph in the embodiment of the present invention.

FIG. 3A shows a flowchart for a process of obtaining execution frequency information on execution paths in a control flow graph in accordance with the embodiment of the present invention.

In step 301, the computer (101) starts processing for obtaining execution frequency information on execution paths in a control flow graph.

In step 302, the computer (101) reads a source code to be compiled, given on a function or method basis to be profiled, for example, from a storage medium (391) storing the source code into the main memory (103).

In step 303, the computer (101) prepares a control flow graph from the source code read into the memory. Preparation of the control flow graph may be performed by a conventional technique selected as desired. The control flow graph prepared in step 303 is, for example, the control flow graphs (201, 211, 221, and 231) (before modification) respectively shown in FIGS. 2A, 2B, 2C, and 2D.

In step 304, the computer (101) is capable of determining on an optional basis whether to modify the control flow graph prepared in step 303 in accordance with the embodiment of the present invention. The computer (101) advances the process to step 305 in the case of modifying the control flow graph. The computer (101) advances the process to step 306 in the case of not modifying the control flow graph. Since step 304 is optional, the computer may advance the process from processing in step 303 directly to processing in step 305.

In step 305, the computer (101) performs processing for modifying the control flow graph prepared in step 303 in accordance with the embodiment of the present invention. Modification processing in step 305 is described below in detail with reference to FIGS. 3B and 3C.

In step 306, the computer (101) obtains execution frequency information by using the control flow graph modified in step 305. In the case where step 305 is not carried out, the computer (101) obtains execution frequency information by using the control flow graph prepared in step 303.

In step 307, the computer (101) ends the process of obtaining execution frequency information on the execution paths in the control flow graph.

Figure 3B:
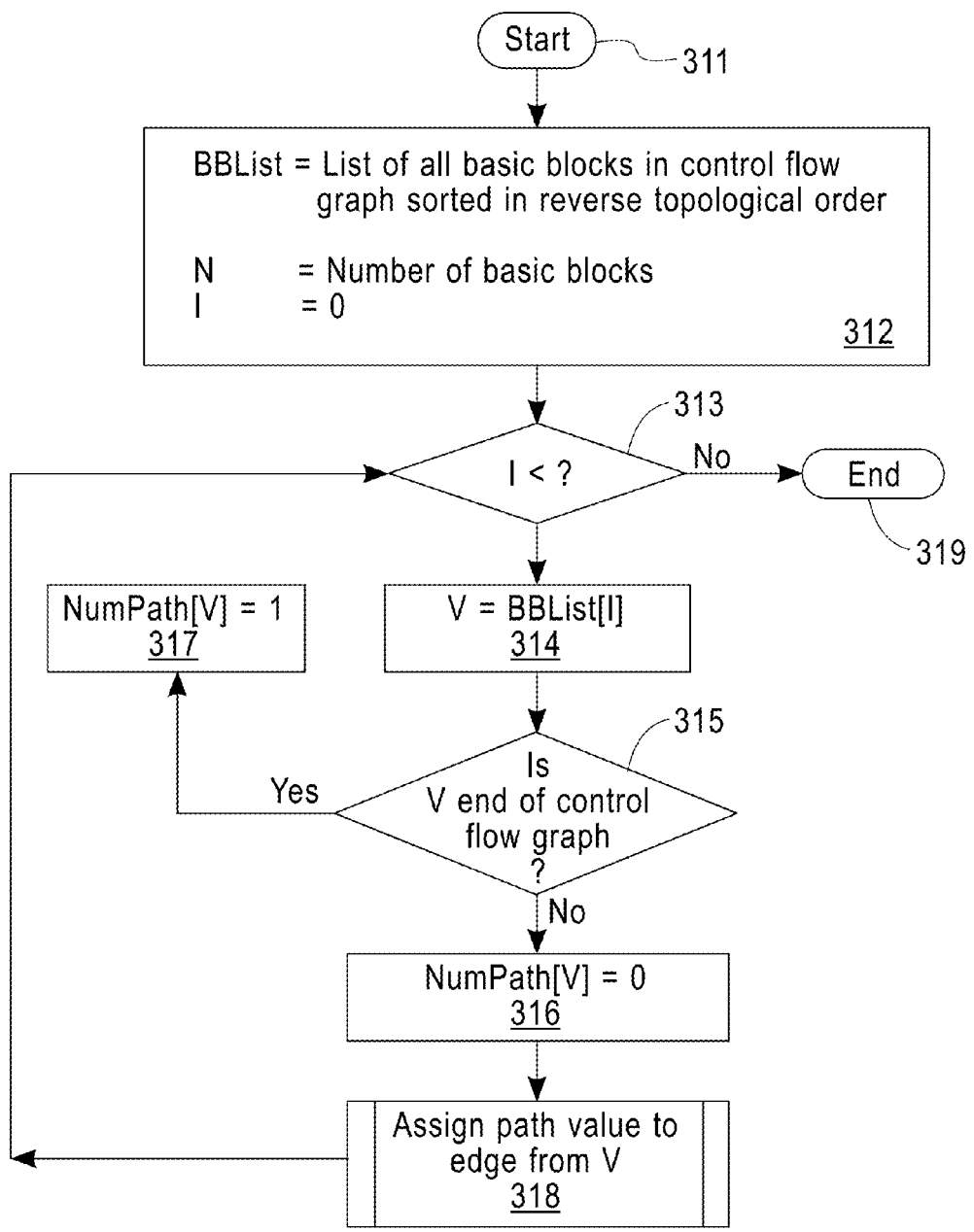
FIG. 3B is a flowchart for processing for modifying the control flow graph in the embodiment of the present invention.

FIG. 3B shows a flowchart for a process of modifying, in accordance with the embodiment of the present invention, the control flow graph prepared in step 303 shown in FIG. 3A.

The flowchart shown in FIG. 3B shows a process in which in order to see each of basic blocks in the control flow graph from the end point, determination is made as to whether or not the basic block is the end of the control flow graph, and in which if the basic block is not the end, a path value is assigned to an edge from the basic block which is not the end.

In step 311, the computer (101) starts processing for modifying the control flow graph.

In step 312, the computer (101) prepares a list of all the basic blocks (BBList) in the control flow graph sorted in a reverse topological order, the number of basic blocks (N) in the control flow graph, and a variable (I; initial value=0) used to take out the basic blocks one by one from the list of all the basic blocks (BBList). The above-mentioned Non-patent Literature 2 should be referred to for details of the reverse topological order.

In step 313, the computer (101) determines whether or not the above-mentioned number of basic blocks (N) is larger than the above-mentioned variable (I). Step 313 is a loop for performing processing from step 313 to 318 with respect to all the basic blocks in the above-described control flow graph. If the number of basic blocks (N) is larger than the variable (I), the computer (101) advances the process to step 314. If the number of basic blocks (N) is not larger than the variable (I) (that is, if the variable (I) is larger than the number of basic blocks (N)), the computer advances (101) the process to end step 319.

In step 314, the computer (101) takes out one basic block V from the BBList according to the case where the number of basic blocks (N) is larger than the variable (I).

In step 315, for assignment of a value (0 or 1) to the basic block V, the computer (101) determines whether or not the basic block V taken out is the basic block at the end (exit) of the control flow graph. If the basic block V taken out is not the basic block at the end of the control flow graph, the computer (101) advances the process to step 316. If the basic block V taken out is the basic block at the end of the control flow graph, the computer (101) advances the process to step 317.

In step 316, the computer (101) assigns a value 0 to the basic block V which is not at the end of the control flow graph (NumPath[V]=0) according to the case where the basic block V taken out is not the basic block at the end. This value 0 is a value assigned to the basic block V but it is replaced with a unique value for each basic block in the control flow graph in step 328 shown in FIG. 3C.

In step 317, the computer (101) assigns a value 1 to the basic block V which is at the end of the control flow graph (NumPath[V]=1) according to the case where the basic block V taken out is the basic block at the end.

In step 318, the computer (101) performs processing for assigning a path value to an edge from the basic block V to which the value 0 is assigned in step 316 (that is, in the case where the basic block V is not at the end of the control flow graph). That is, in step 318, processing for assigning a path value to an edge from a predecessor basic block other than the basic block at the end is performed. Processing in step 318 for assigning a path value to an edge from the basic block V not at the end is described below in detail with reference to a flowchart shown in FIG. 3C.

In step 319, the computer (101) ends the processing for modifying the control flow graph according to the case where the variable (I) is larger than the number of basic blocks (N) in the control flow graph in the determination step in step 313.

Figure 3C:
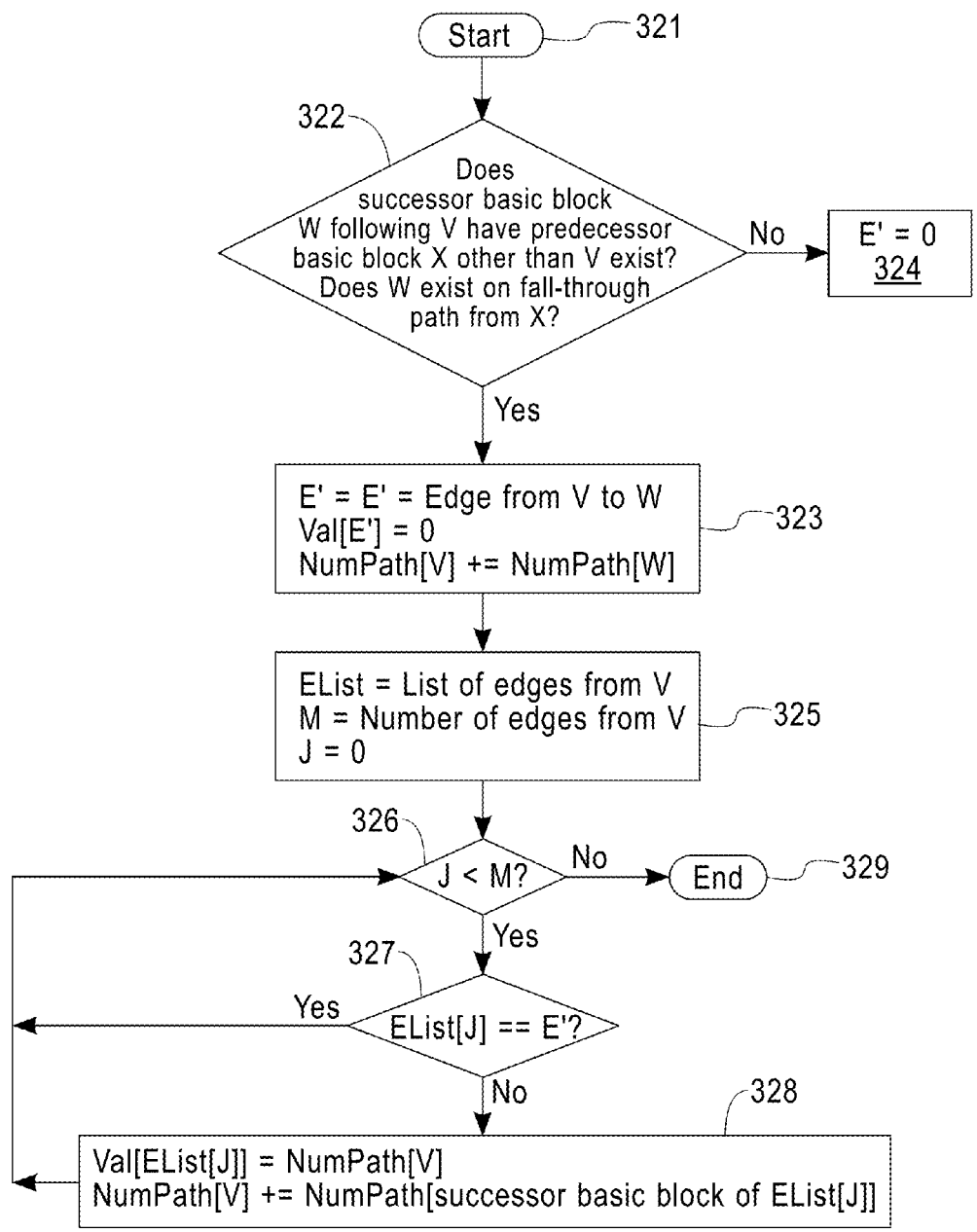
FIG. 3C is a flowchart for processing for assigning values to edges in the processing for modifying the control flow graph in the embodiment of the present invention.

FIG. 3C shows a flowchart for a processing of assigning values to edges in processing for modifying the control flow graph in accordance with the embodiment of the present invention.

FIG. 3C shows processing for giving a path value to an edge from the basic block V to which the value 0 is assigned in step 316 shown in FIG. 3B (that is, the basic block V not at the end).

In step 321, the computer (101) starts processing for assigning a value to the edge.

In step 322, the computer (101) determines whether the condition is met that requires that a predecessor basic block X, other than the basic block V to which the value 0 is assigned (in step 316 shown in FIG. 3B), precedes a successor basic block W following the basic block V, and that the successor basic block W exists on the fall-through path from the predecessor basic block X. If the condition is met, the computer (101) advances the process to step 323. If the condition is not met, the computer (101) advances the process to step 324.

In step 323, the computer (101) assigns a path value 0 to an edge E' (i.e., V→W in the above-described case) (Val[E']=0) between the above-described basic block V (corresponding to the basic block v shown in FIGS. 2A to 2D, for example) and the above-described successor basic block W (corresponding to the basic block w or w1 shown in FIGS. 2A to 2D, for example) according to the case where the above-described condition is met. The reason for assigning the path value 0 is that if the path value 0 is assigned to the edge, there is no need to perform processing for addition/subtraction on the edge, and the need to insert a basic block on the edge and the need for a jump instruction are thereby eliminated to achieve a cost-reduction effect. The computer (101) also updates the value of the basic block V by adding the value of the successor basic block W to the value of the basic block V in order to make the values of the basic blocks in the control flow graph unique from the end point toward the beginning point (NumPath[V]+=NumPath [W]).

In step 324, the computer (101) assigns a path value 0 to the edge E' from the basic block V (E'=0) according to the case where the above-described condition is not met.

In step 325, the computer (101) prepares a list of edges from the basic block V (EList), the number of edges (M) from the basic block V, and a variable (J; initial value=0) used to take out edges one by one from the list of edges (EList). In the list of edges (EList) from the basic block V, all edges from the basic block V are listed. Before a start of a loop from step 326 to step 328, the path value 0 is assigned only to the edge from the basic block V to the basic block W (step 323). Path values are assigned to the other edges from the basic block V by repeating steps 326 to 328. Assignments of path values to the other edges are made in step 328 described below. Path values are assigned to the other edges, for example, in a way according to the order in which the edges are taken out (for example, in ascending order of 1, 2, 3) such that the other edges respectively have unique values as desired.

In step 326, the computer (101) determines whether or not the number of edges (M) from the basic block V is larger than the variable (J). Step 326 is a loop for performing processing in step 327 with respect to all the edges from the basic block V. If the number of edges (M) from the basic block V is larger than the variable (J), the computer (101) advances the process to step 327. If the number of edges (M) from the basic block V is not larger than the variable (J) (that is, if the variable (J) is larger than the number of edges (M) from the basic block V), the computer (101) advances the process to end step 329.

In step 327, the computer (101) takes out one edge from the list of edges (EList) from the basic block v according to the case where the number of edges (M) from the basic block V is larger than the variable (J), and further determines whether or not the value of the edge taken out is contained in the list of edges (EList) from the basic block v, that is, whether or not the path value has already been assigned to the edge (EList[J]==E'). If the value of the edge taken out is not contained in the list of edges (EList) from the basic block V, the computer (101) advances the process to step 328 to assign a path value to this edge. If the value of the edge taken out is contained in the list of edges (EList) from the basic block V, the computer (101) returns the process to step 326 since there is no need to assign any path value to the edge.

In step 328, the computer (101) assigns the value (non-zero value) of the basic block V as a path value (Val[EList[J]]=NumPath[V]) according to the case where the path value of the edge taken out is not contained in the list of edges (EList) from the basic block V, and updates the value of the basic block V by adding the value of the successor basic block EList[J] to the value of the basic block V (NumPath[V]+=NumPath[EList[J] successor basic block]). Since NumPath[EList[J] successor basic block] has already been made non-zero, the updated value of the basic block V is also a non-zero value. This is because the process shown in FIGS. 3B and 3C is performed on the basic blocks from the end point, and because, at the time of path value assignment to edges from one basic block V, processing on the successor basic block following the basic block V is already completed. Steps 326 to 328 are repeated to assign unique path values (except the path value 0 assigned in step 323) to the edges from the above-described basic block V.

In step 329, the computer (101) ends the process of assigning path values to the edges from the above-described basic block V according to the case where the variable (J) is larger than the number of edges (M) from the basic block V in the determination in step 326.

FIG. 4 shows an example of an algorithm for executing processing for assigning a value to an edge requiring insertion of a new basic block in the process of modifying a control flow graph in accordance with the embodiment of the present invention.

The above-mentioned algorithm (401) is an algorithm for assigning a value Val(e) to an edge e. FIGS. 01 to 13 are inserted in this algorithm for ease of description and are unnecessary in the actual code.

In the embodiment of the present invention, a value to be added or subtracted on an edge requiring insertion of a new basic block in a control flow graph (e.g., the edge v→w shown in FIG. 2A, the edge v→w shown in FIG. 2B, the edge v→w1 shown in FIG. 2C, and the edge v→w1 shown in FIG. 2D) is set to zero. That is, a path value 0 is assigned to an edge requiring insertion of a new basic block in a control flow graph. By assignment of the path value 0 to the edge, the need for the instrumentation code on the edge is eliminated and the need for insertion of a new basic block is also eliminated.

In the above-described algorithm (401), a code shown in lines 06, 07, 08, 09 and 11 is a code added in the embodiment of the present invention, and is an algorithm for assigning the value Val(e) to the edge e. Lines 05, 07, 08, and 12 correspond to an algorithm for assigning the path value 0 to the first edge in accordance with the embodiment of the present invention.

Line 01 corresponds to step 312 shown in FIG. 3B.
Line 02 corresponds to step 315 shown in FIG. 3B.
Line 03 corresponds to step 316 shown in FIG. 3B.
Lines 04 and 05 correspond to step 317 shown in FIG. 3B.
Line 06 corresponds to step 322 shown in FIG. 3C.
Lines 07 to 09 correspond to step 323 shown in FIG. 3C.
Line 10 corresponds to step 326 shown in FIG. 3C.
Line 11 corresponds to step 327 shown in FIG. 3C.
Lines 12 and 13 correspond to step 328 shown in FIG. 3C.

The term: findNewBBEdge(v) shown in line 06 specifies a condition for a need for a new basic block on the edge v→w (or v→w1) between the predecessor basic block v and the successor basic block w (or w1). This condition requires that the successor basic block w following the predecessor basic block v have a predecessor basic block x other than the predecessor basic block v, and that the successor basic block w exist on the fall-through path from the predecessor basic block x.

Figure 5:
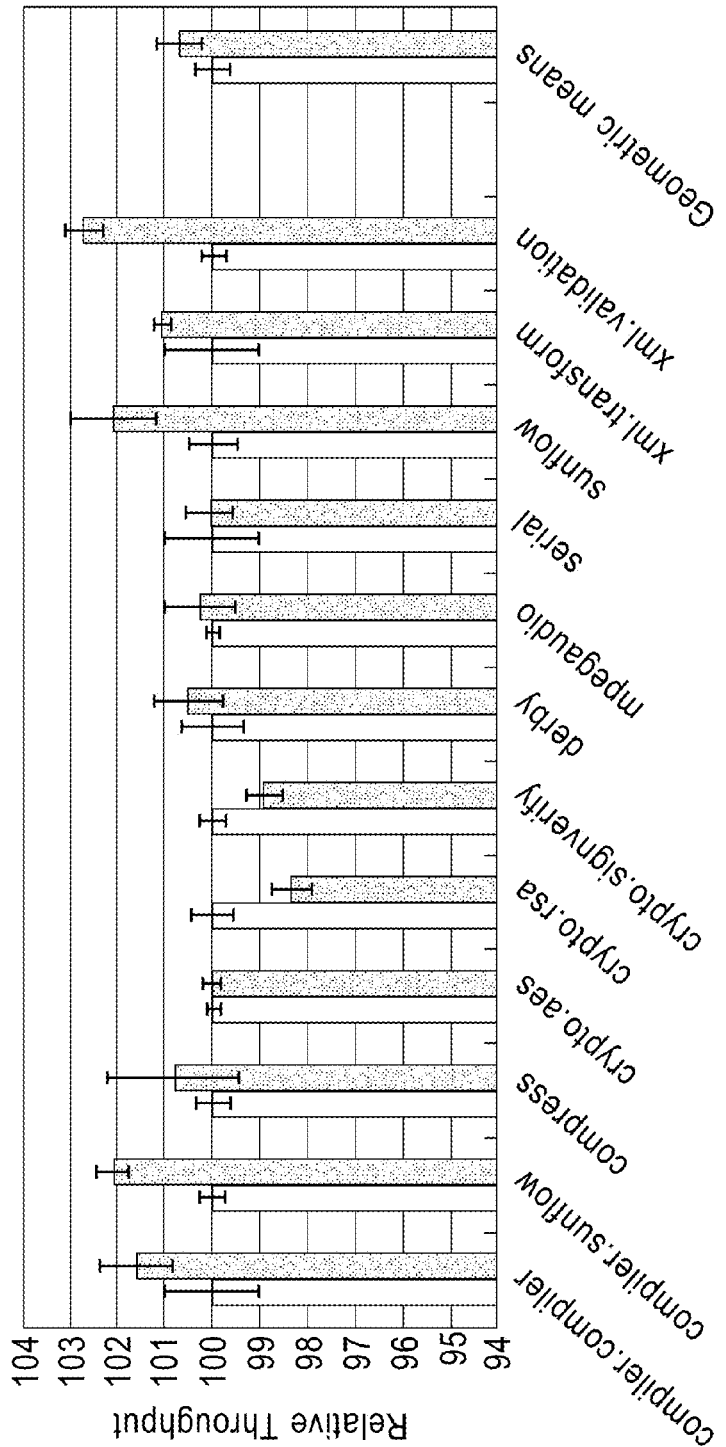
FIG. 5 shows the results of comparison between the throughput of a program that implements in a compiler an algorithm enabling the method according to the prior art and the throughput of a program that implements in a compiler the algorithm enabling execution of the embodiment of the present invention.

FIG. 5 shows the results of comparison between the throughput of a program that implements in a compiler the algorithm enabling the method according to the prior art and the throughput of a program that implements in a compiler the algorithm enabling execution of the embodiment of the present invention.

The program that implements in a compiler the algorithm enabling the method according to the prior art is a program that implements the method described in Non-patent Literature 2.

The program that implements in a compiler the algorithm enabling execution of the embodiment of the present invention exhibited an improvement in performance by 0.7% on average (see geometric means) and 2.7% at the maximum (xml. validation) in comparison with the program that implements the algorithm enabling execution of the method according to the prior art.

Figure 6:
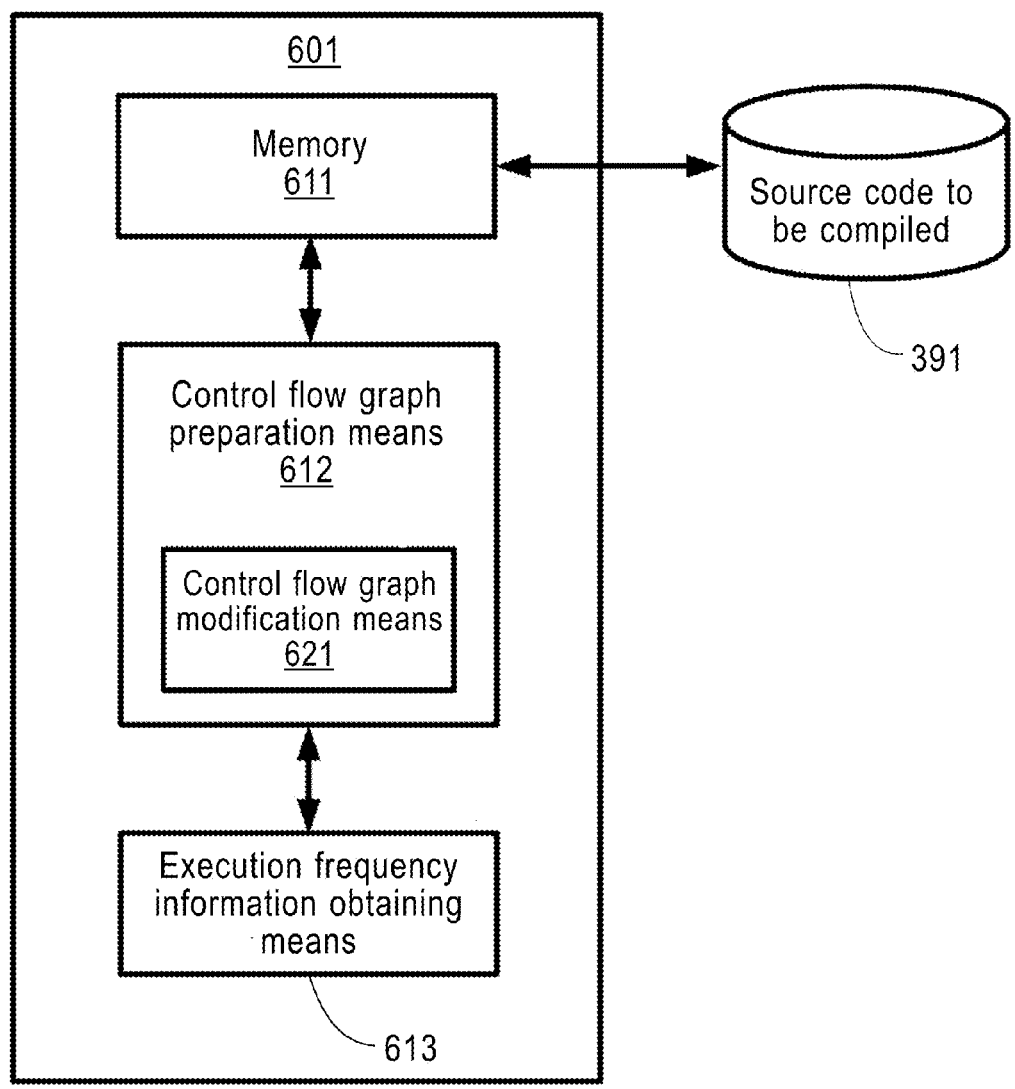
FIG. 6 is a diagram showing an example of a function block diagram of a computer for obtaining execution frequency information on execution paths in a control flow graph, the computer preferably having a hardware configuration according to FIG. 1.

FIG. 6 is a diagram showing an example of a function block diagram of a computer for obtaining execution frequency information on execution paths in a control flow graph. Preferably, the computer has a hardware configuration according to FIG. 1.

A computer (601) is a computer for obtaining execution frequency information on execution paths in a control flow graph in accordance with the embodiment of the present invention, for example, the computer (101) shown in FIG. 1.

The computer (601) has a memory (611), control flow graph preparation means (612) and execution frequency information obtaining means (613). The control flow graph preparation means (612) includes control flow graph modification means (621). The control flow graph modification means (621) is a means added in the embodiment of the present invention. The computer (601) may have the control flow graph preparation means (612) and control flow graph modification means (621) provided separately from each other.

The memory (611) stores a source code to be compiled, which is read by the computer from the storage medium (391) storing the source code to be compiled.

The computer (601) uses the memory (611) in execution of step 302 shown in FIG. 3A.

The control flow graph preparation means (612) prepares a control flow graph from a source code to be compiled.

If a predecessor basic block x other than the predecessor basic block v precedes the successor basic block w following the predecessor basic block v, and if the successor basic block w exists on the fall-through path from the predecessor basic block x, the control flow graph modification means (621) assigns a path value 0 to the edge v→w between the predecessor basic block v and the successor basic block w, thereby modifying the control graph.

If a successor basic block w' other than the successor basic block w following the predecessor basic block v has no predecessor basic block other than the predecessor basic block v, the control flow graph modification means (621) may insert an instruction to add a path value in the successor basic block w'.

If the successor basic block w' other than the successor basic block w following the predecessor basic block v has a predecessor basic block y other than the predecessor basic block v, the control flow graph modification means (621) may insert a new basic block m on the edge v→w' between the predecessor basic block v and the successor basic block w' and may insert an instruction to add a path value in the basic block m.

If the successor basic block w' exists on the fall-through path from the predecessor basic block y, the control flow graph modification means (621) may insert in the basic block m an instruction to make a jump to the basic block w'.

If three or more successor basic blocks {w1, . . . , wn} exist subsequently to the predecessor basic block v, the control flow graph modification means (621) may modify the control flow graph by taking out one successor basic block wi in the three or more successor basic blocks {w1, . . . , wn} provided that the successor basic block wi has a predecessor basic block x other than the predecessor basic block v existing as a successor basic block following the predecessor basic block v and exists on the fall-through path from the predecessor basic block x, and by assigning zero to an edge v→wi between the predecessor basic block v and the successor basic block wi taken out. Taking the above-described successor basic block wi satisfying the above-described condition out of the plurality of successor basic blocks {w1, . . . , wn} may comprise taking out the successor basic block wi with a higher execution frequency according to a state where the execution frequencies of some of the plurality of successor basic blocks {w1, . . . , wn} are known.

The control flow graph modification means (621) may insert an instruction to add a path value on an edge v→wj between the predecessor basic block v and a successor basic block wj other than the successor basic block wi to which zero is assigned as described above.

If the successor basic block wj does not exist on the fall-through path from the predecessor basic block v, and if the successor basic block wj has a predecessor basic block other than the predecessor basic block v, the control flow graph modification means (621) may insert a jump instruction to make a jump to the successor basic block wj immediately after the instruction to add a path value.

The control flow graph preparation means (612) may execute step 303 shown in FIG. 3A.

The control flow graph modification means (621) executes steps 304 and 305 shown in FIG. 3A and the steps shown in FIGS. 3B and 3C.

The control flow graph modification means (621) inserts an instruction to add a path value in the successor basic block x (corresponding to the successor basic block w'), as shown in FIG. 2A (Example 1). However, the successor basic block x having the insertion includes no jump instruction.

If the predecessor basic block y does not exist on the edge v→x between the predecessor basic block v and the successor basic block x but precedes the successor basic block x, the control flow graph modification means (621) inserts a basic block m including an instruction to add a path value between the predecessor basic block v and the successor basic block x, as shown in FIG. 2B (Example 2). However, the inserted basic block m includes no jump instruction.

The control flow graph modification means (621) inserts an instruction to add a path value in the successor basic block x (corresponding to the successor basic block w'), as shown in FIG. 2C (Example 3). However, the successor basic block x having the insertion includes no jump instruction.

If the predecessor basic block y does not exist on the edge v→x between the predecessor basic block v and the successor basic block x but precedes the successor basic block x, the control flow graph modification means (621) inserts a basic block q including an instruction to add a path value between the predecessor basic block v and the successor basic block x, as shown in FIG. 2D (Example 4). However, the inserted basic block q includes no jump instruction.

The execution frequency information obtaining means (613) obtains execution frequency information by using the control flow graph modified by the control flow graph modification means (621).

The execution frequency information obtaining means (613) executes step 306 shown in FIG. 3A.

The invention claimed is:

1. A method for obtaining execution frequency information on execution paths in a control flow graph, the method comprising causing a computer to execute the steps of:
   reading, by one or more computer processors, into a memory a source code to be complied;
   preparing, by one or more computer processors, a control flow graph from the source code read into the memory, the preparing step including, prior to modification of the control flow graph, assigning zero to an edge v→w between a basic block v in a precedent position (hereinafter referred to as "predecessor basic block") and a basic block w following the predecessor basic block v (hereinafter referred to as "successor basic block") in a case where the successor basic block w has a predecessor basic block x other than the predecessor basic block v, and where the successor basic block w exists on a fall-through path from the predecessor basic block x, and wherein when zero is assigned to the edge v→w, no instruction to add a path value to the edge v→w is added;
   modifying, by one or more computer processors, the control flow graph according to one of the following steps:
   1) inserting an instruction to add a path value in a successor basic block w' other than the successor basic block w in a case where the successor basic block w' other than the successor basic block w following the predecessor basic block v has no predecessor basic block other than the predecessor basic block v;
   2) inserting a basic block m on an edge v→w' between the predecessor basic block v and a successor basic block w' other than the successor basic block w and inserting an instruction to add a path value in the basic block m in a case where the successor basic block w' other than the successor basic block w following the predecessor basic block v has a predecessor basic block y other than the predecessor basic block v; or
   3) modifying the control flow graph by taking out one successor basic block wi from three or more successor basic blocks {w1, . . . , wn} if the three or more successor basic blocks {w1, . . . , wn} exist subsequently to the predecessor basic block v, provided that the successor basic block wi has a predecessor basic block x other than the predecessor basic block v existing as a successor basic block following the predecessor basic block v and exists on a fall-through path from the predecessor basic block x, and by assigning zero to an edge v→wi between the predecessor basic block v and the successor basic block wi taken out; and
   obtaining, by one or more computer processors, the execution frequency information by using the control flow graph modified by the modifying step.

2. The method according to claim 1, wherein the step of modifying the control flow graph further includes, responsive to inserting a basic block m on an edge v→w' between the predecessor basic block v and a successor basic block w', a step of inserting in the basic block m a jump instruction to make a jump to the successor basic block w' if the successor basic block w' exists on a fall-through path from the predecessor basic block y.

3. The method according to claim 1, wherein the step of modifying the control flow graph further includes, responsive to taking out one successor basic block wi from three or more successor basic blocks {w1, . . . , wn}, a step of inserting a basic block n on an edge v→wj between the predecessor basic block v and a successor basic block wj other than the successor basic block wi to which zero is assigned, and inserting in the basic block n an instruction to add a path value.

4. The method according to claim 3, wherein the step of modifying the control flow graph further includes a step of inserting a jump instruction to make a jump to the successor basic block wj immediately after the instruction to add a path value in the basic block n if the successor basic block wj does not exist on the fall-through path from the predecessor basic block v, and if the successor basic block wj has a predecessor basic block other than the predecessor basic block v.

5. The method according to claim 1, wherein taking the one successor basic block wi satisfying the condition out of the three or more successor basic blocks {w1, . . . , wn} further includes a step of taking out the successor basic block wi with a higher execution frequency according to a state where the execution frequencies of some of the three or more successor basic blocks {w1, . . . , wn} are known.

6. A computer for obtaining execution frequency information on execution paths in a control flow graph, the computer comprising:
   a memory into which a source code to be complied is read;
   control flow graph preparation means for preparing a control flow graph from the source code read into the memory, the control flow graph preparation means including, prior to modification of the control flow graph, assigning zero to an edge v→w between a basic block v in a precedent position (hereinafter referred to as "predecessor basic block") and a basic block w following the predecessor basic block v (hereinafter referred to as "successor basic block") in a case where the successor basic block w has a predecessor basic block x other than the predecessor basic block v, and where the successor basic block w exists on a fall-through path from the predecessor basic block x, and wherein when zero is assigned to the edge v→w, no instruction to add a path value to the edge v→w is added;
   control flow graph modification means for modifying the control flow graph according to one of the following steps:
   1) inserting an instruction to add a path value in a successor basic block w' other than the successor basic block w in a case where the successor basic block w' other than the successor basic block w following the predecessor basic block v has no predecessor basic block other than the predecessor basic block v;
   2) inserting a basic block m on an edge v→w' between the predecessor basic block v and a successor basic block w' other than the successor basic block w and inserts an instruction to add a path value in the basic block m in a case where the successor basic block w' other than the successor basic block w following the predecessor basic block v has a predecessor basic block y other than the predecessor basic block v; or
   3) modifying the control flow graph by taking out one successor basic block wi from three or more successor basic blocks {w1, . . . , wn} if the three or more successor basic blocks {w1, . . . wn} exist subsequently to the predecessor basic block v, provided that the successor basic block wi has a predecessor basic block x other than the predecessor basic block v existing as a successor basic block following the predecessor basic block v and exists on a fall-through path from the predecessor basic block x, and by assigning zero to an edge v→wi between the predecessor basic block v and the successor basic block wi taken out; and execution frequency information obtaining means for obtaining the execution frequency information by using the control flow graph modified by the control flow graph modification means.

7. The computer according to claim 6, wherein the control flow graph modification means, responsive to inserting a basic block m on an edge v→w' between the predecessor basic block v and a successor basic block w', inserts in the basic block m a jump instruction to make a jump to the basic block w' if the successor basic block w' exists on a fall-through path from the predecessor basic block y.

8. The computer according to claim 6, wherein the control flow graph modification means, responsive to taking out one successor basic block wi from three or more successor basic blocks {w1, ..., wn}, inserts a basic block n on an edge v→wj between the predecessor basic block v and a successor basic block wj other than the successor basic block wi to which zero is assigned, and inserts in the basic block n an instruction to add a path value.

9. The computer according to claim 8, wherein the control flow graph modification means inserts a jump instruction to make a jump to the successor basic block wj immediately after the instruction to add a path value if the successor basic block wj does not exist on the fall-through path from the predecessor basic block v, and if the successor basic block wj has a predecessor basic block other than the predecessor basic block v.

10. The computer according to claim 6, wherein taking the one successor basic block wi satisfying the condition out of the three or more successor basic blocks {w1, ..., wn} includes taking out the successor basic block wi with a higher execution frequency according to a state where the execution frequencies of some of the three or more successor basic blocks {w1, ..., wn} are known.

11. A non-transitory computer program product for obtaining execution frequency information on execution paths in a control flow graph, the computer program product causing a computer to:

read into a memory a source code to be complied;

prepare a control flow graph from the source code read into the memory, the preparing step including, prior to modification of the control flow graph, assigning zero to an edge v→w between a basic block v in a precedent position (hereinafter referred to as "predecessor basic block") and a basic block w following the predecessor basic block v (hereinafter referred to as "successor basic block") in a case where the successor basic block w has a predecessor basic block x other than the predecessor basic block v, and where the successor basic block w exists on a fall-through path from the predecessor basic block x, and wherein when zero is assigned to the edge v→w, no instruction to add a path value to the edge v→w is added;

modify the control flow graph according to one of the following steps:

1) inserting an instruction to add a path value in a successor basic block w' other than the successor basic block w in a case where the successor basic block w' other than the successor basic block w following the predecessor basic block v has no predecessor basic block other than the predecessor basic block v 2) inserting a basic block m on an edge v→w' between the predecessor basic block v and a successor basic block w' other than the successor basic block w and inserting an instruction to add a path value in the basic block m in a case where the successor basic block w' other than the successor basic block w following the predecessor basic block v has a predecessor basic block y other than the predecessor basic block v 3) modifying the control flow graph by taking out one successor basic block wi from three or more successor basic blocks {w1, ..., wn} if the three or more successor basic blocks {w1, ..., wn} exist subsequently to the predecessor basic block v, provided that the successor basic block wi has a predecessor basic block x other than the predecessor basic block v existing as a successor basic block following the predecessor basic block v and exists on a fall-through path from the predecessor basic block x, and by assigning zero to an edge v→wi between the predecessor basic block v and the successor basic block wi taken out; and obtain the execution frequency information by using the control flow graph modified by the modifying step.

* * * * *